(12) United States Patent
Park

(10) Patent No.: US 11,333,846 B2
(45) Date of Patent: May 17, 2022

(54) LENS DRIVING APPARATUS, AND CAMERA MODULE AND OPTICAL DEVICE COMPRISING SAME

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 14 days.

(21) Appl. No.: 16/652,310

(22) PCT Filed: Sep. 21, 2018

(86) PCT No.: PCT/KR2018/011223
§ 371 (c)(1),
(2) Date: Mar. 30, 2020

(87) PCT Pub. No.: WO2019/066400
PCT Pub. Date: Apr. 4, 2019

(65) Prior Publication Data
US 2020/0241238 A1    Jul. 30, 2020

(30) Foreign Application Priority Data
Sep. 29, 2017 (KR) .................. 10-2017-0127633

(51) Int. Cl.
*G02B 7/28* (2021.01)
*G03B 3/10* (2021.01)
(Continued)

(52) U.S. Cl.
CPC ................. *G02B 7/28* (2013.01); *G03B 3/10* (2013.01); *G03B 13/36* (2013.01); *G03B 17/12* (2013.01); *H02K 41/0356* (2013.01)

(58) Field of Classification Search
CPC ...................................................... G02B 7/28
(Continued)

(56) References Cited

U.S. PATENT DOCUMENTS

2011/0096178 A1    4/2011   Ryu et al.
2013/0314810 A1   11/2013   Sekimoto et al.
(Continued)

FOREIGN PATENT DOCUMENTS

CN    104614918 A    5/2015
CN    104937482 A    9/2015
(Continued)

*Primary Examiner* — Joel W Fosselman
(74) *Attorney, Agent, or Firm* — Birch, Stewart, Kolasch & Birch, LLP

(57) ABSTRACT

An embodiment comprises: a housing; a bobbin which is placed inside the housing and moves along an optical axis; a coil which is placed on the bobbin and to which a driving signal and a sensing signal are provided; magnets which are placed on the housing; and a position sensor which is placed on the housing. The position sensor senses the position of the bobbin by means of a magnetic field generated by means of the coil. The magnets comprise a first magnet and a second magnet. The position sensor is placed adjacent to the first magnet and/or the second magnet. The position sensor and the first magnet and/or the second magnet do not overlap in the direction from the position sensor to the optical axis.

20 Claims, 26 Drawing Sheets

(51) Int. Cl.
*G03B 13/36* (2021.01)
*G03B 17/12* (2021.01)
*H02K 41/035* (2006.01)

(58) Field of Classification Search
USPC .................................................. 348/208.12
See application file for complete search history.

(56) References Cited

U.S. PATENT DOCUMENTS

| | | |
|---|---|---|
| 2015/0207983 A1 | 7/2015 | Kang et al. |
| 2015/0331251 A1 | 11/2015 | Hu et al. |
| 2016/0320585 A1* | 11/2016 | Park .................... H04N 5/2257 |
| 2018/0321459 A1 | 11/2018 | Kim et al. |

FOREIGN PATENT DOCUMENTS

| | | |
|---|---|---|
| CN | 106101494 A | 11/2016 |
| JP | 2009-8936 A | 1/2009 |
| JP | 2012-256017 A | 12/2012 |
| JP | 10-2017-0092809 A | 8/2017 |
| KR | 10-2007-0120260 A | 12/2007 |
| KR | 10-0918816 B1 | 9/2009 |
| KR | 10-1028093 B1 | 4/2011 |
| KR | 10-2015-0051097 A | 5/2015 |
| KR | 10-2017-0050946 A | 5/2017 |
| KR | 10-2017-0083755 A | 7/2017 |
| WO | WO 2017/122993 A1 | 7/2017 |

\* cited by examiner

LENS DRIVING APPARATUS, AND CAMERA MODULE AND OPTICAL DEVICE COMPRISING SAME

CROSS REFERENCE TO RELATED APPLICATIONS

This application is the National Phase of PCT International Application No. PCT/KR2018/011223, filed on Sep. 21, 2018, which claims priority under 35 U.S.C. 119(a) to Patent Application No. 10-2017-0127633, filed in the Republic of Korea on Sep. 29, 2017, all of which are hereby expressly incorporated by reference into the present application.

TECHNICAL FIELD

Embodiments relate to a lens moving apparatus and to a camera module and an optical device each including the same.

BACKGROUND ART

Technology of a voice coil motor (VCM), which is used in existing general camera modules, is difficult to apply to a miniature low-power camera module, and studies related thereto have been actively conducted.

In the case of a camera module configured to be mounted in a small electronic product, such as a smart phone, the camera module may frequently receive shocks when in use, and may undergo fine shaking due to, for example, the shaking of a user's hand. In consideration thereof, technology enabling a device for preventing handshake to be additionally installed to a camera module is being developed.

DISCLOSURE

Technical Problem

Embodiments provide a lens moving apparatus capable of preventing magnetic-field interference between a drive magnet and a sensing magnet and improving the accuracy and reliability of AF operation, and to a camera module and an optical device each including the same.

Technical Solution

A lens moving apparatus according to an embodiment includes a housing, a bobbin disposed inside the housing, a coil disposed at the bobbin, a drive signal and a sensing signal being provided to the coil, a magnet disposed at the housing, and a position sensor disposed at the housing, wherein the position sensor detects the location of the bobbin based on a magnetic field generated by the coil, wherein the magnet includes a first magnet and a second magnet, wherein the position sensor is disposed adjacent to at least one of the first magnet and the second magnet, and wherein the position sensor does not overlap at least one of the first magnet and the second magnet in a direction toward the optical axis from the position sensor.

The position sensor may be disposed adjacent to the first magnet, and may not overlap the first magnet in the direction toward the optical axis from the position sensor.

The magnet may not be disposed between the position sensor and a coil region, the coil region being a partial region of the coil that overlaps the position sensor in the direction toward the optical axis from the position sensor.

The position sensor may be disposed between the first magnet and the second magnet.

The drive signal may be a DC signal, and the sensing signal may be a DC signal or an AC signal.

An output signal of the position sensor may include a zone in which the output signal varies linearly as the bobbin is moved.

Each of the drive signal and the sensing signal may be a DC signal.

The coil may include a first coil and a second coil, which are disposed on an outer surface of the bobbin and are conductively isolated from each other, wherein the first coil is provided with the drive signal, which is a DC signal, and the second coil is provided with the sensing signal, which is an AC signal.

A maximum value of the sensing signal may be greater than an intensity of the drive signal.

A first magnetic field of the first coil, responding to the drive signal, and a second magnetic field of the second coil, responding to the sensing signal, may be generated in a direction such that the two magnetic fields are reinforced by each other.

A magnet corresponding to the position sensor may not be disposed at the bobbin.

The drive signal may be a PWM (pulse width modulation) signal, and the sensing signal may be an AC signal.

The drive signal may be provided to the coil in a time-division manner, and the maximum value of the sensing signal may be greater than the maximum value of the drive signal.

Each of the drive signal and the sensing signal may be a PWM (pulse width modulation) signal, and the duty ratio of the PWM signal, which is the sensing signal, may be less than the duty ratio of the PWM signal, which is the drive signal.

A camera module according to an embodiment includes a lens barrel, the lens moving apparatus according to the embodiment for moving the lens barrel, an image sensor configured to convert an image, which is incident through the lens moving apparatus, into an electrical signal, and a controller configured to output an amplified signal obtained by amplifying an output of the position sensor, to create a digital value resulting from analog/digital conversion of the amplified signal, and to detect displacement of a bobbin based on the created digital value and data corresponding to the displacement of the bobbin stored in a lookup table.

Advantageous Effects

The embodiments are capable of decreasing the number of components and manufacturing costs.

Furthermore, the embodiments are capable of preventing magnetic-field interference between a drive magnet and a sensing magnet and improving the accuracy and reliability of AF operation.

In addition, the embodiments are capable of increasing electromagnetic force and reducing power consumption.

BEST MODE

Figure 1:
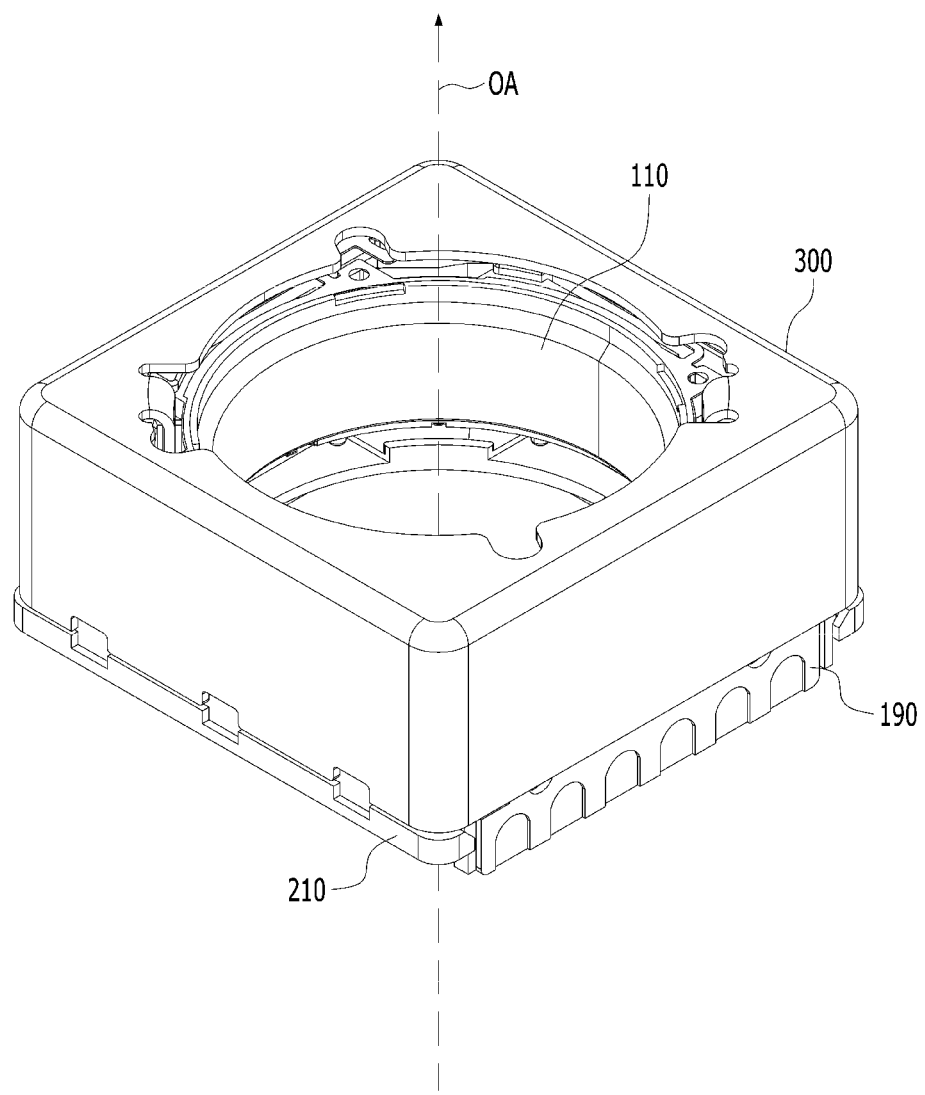
FIG. 1 is a perspective view of a lens moving apparatus according to an embodiment.

Hereinafter, embodiments of the present invention capable of concretely achieving the above objects will be described with reference to the accompanying drawings.

In the following description of the embodiments, it will be understood that, when an element is referred to as being formed "on" or "under" another element, it can be directly "on" or "under" the other element, or can be indirectly disposed, with one or more intervening elements therebetween. In addition, it will also be understood that "on" or "under" the element may mean an upward direction or a downward direction based on the element.

In addition, relative terms such as, for example, "first", "second", "on/upper/above" and "beneath/lower/below", used in the following description may be used to distinguish any one substance or element with another substance or element without requiring or containing any physical or logical relationship or sequence between these substances or elements. The same reference numeral designates the same element throughout all the drawings.

Unless otherwise defined, the terms "comprise," "include" or "have" used in the above description are used to designate the presence of features, steps or combinations thereof described in the specification, and should be understood so as not to exclude the presence or probability of additional inclusion of one or more different features, steps or combinations thereof. Furthermore, the terms "correspond" or the like may include at least one of designations of "face" or "overlap".

For the convenience of description, although the lens moving apparatus is described using a rectangular coordinate system (x, y, z), the lens moving apparatus may be described using some other coordinate systems, and the embodiments are not limited thereto. In the respective drawings, the X-axis and the Y-axis mean directions perpendicular to an optical axis, i.e. the Z-axis, and the optical axis (Z-axis) direction or a direction parallel to the optical axis may be referred to as a "first direction", the X-axis direction may be referred to as a "second direction", and the Y-axis direction may be referred to as a "third direction".

The term "auto-focusing" means an operation of automatically focusing an image of a subject on an image sensor surface. The lens moving apparatus according to an embodiment may move an optical module, which is constituted of at least one lens, thereby performing auto-focusing.

Figure 2:
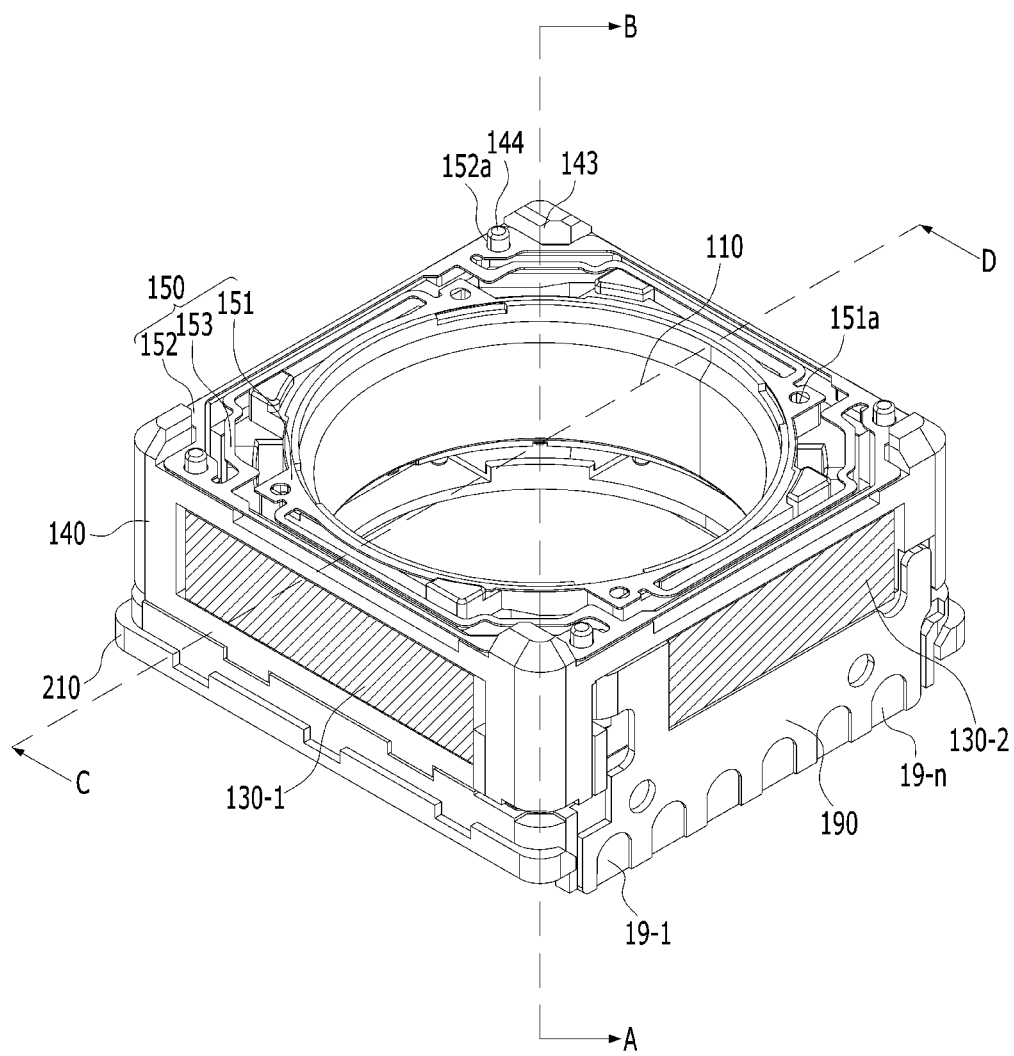
FIG. 2 is a view illustrating the assembled lens moving apparatus shown in FIG. 1, from which a cover member is removed.
Figure 3A:
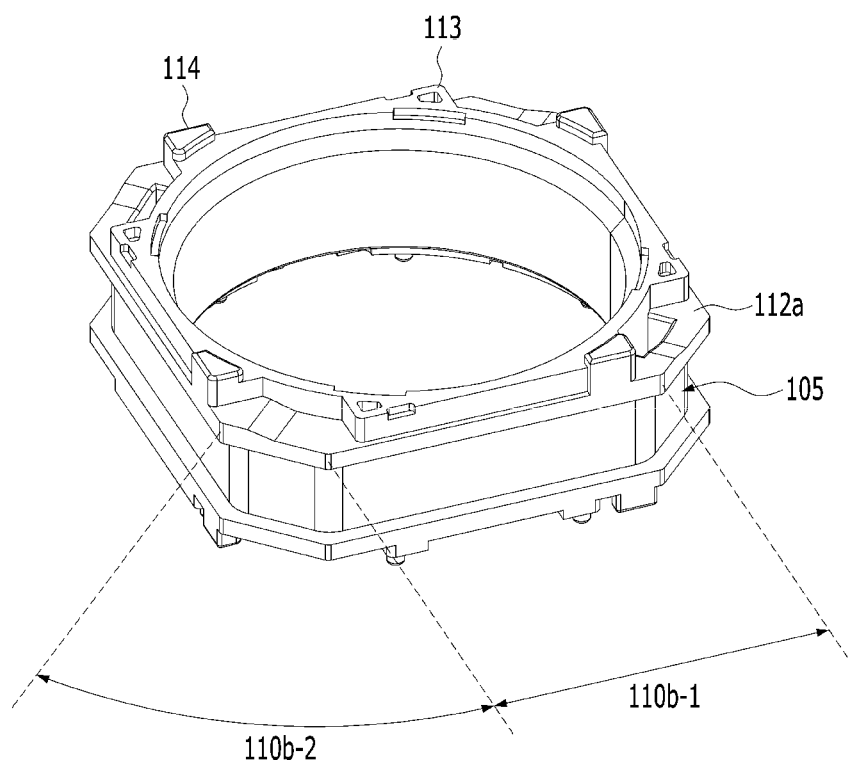
FIG. 3A is a perspective view of a bobbin shown in FIG. 2.
Figure 3B:
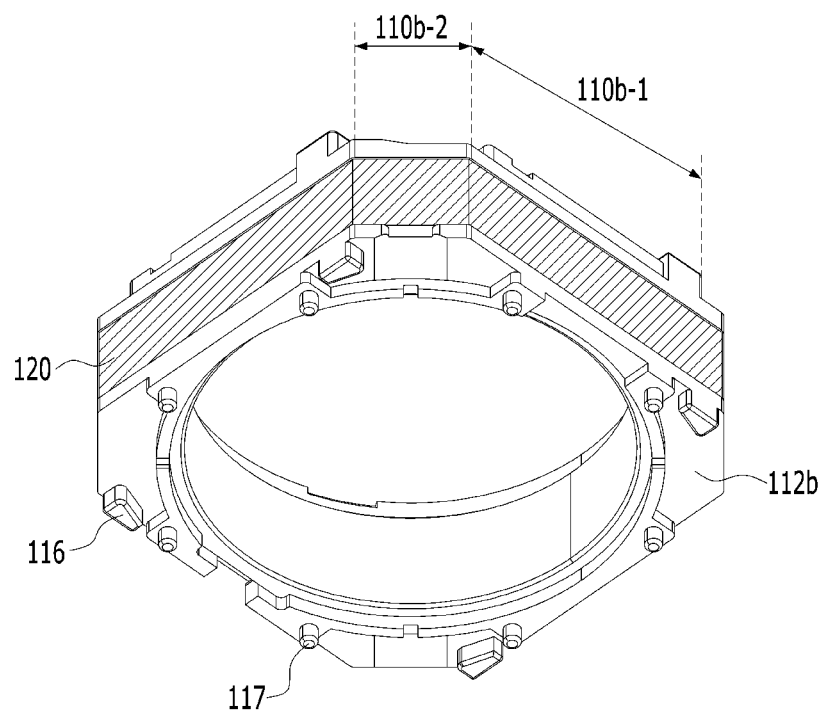
FIG. 3B is a perspective view of a coil coupled to the bobbin shown in FIG. 2.
Figure 4A:
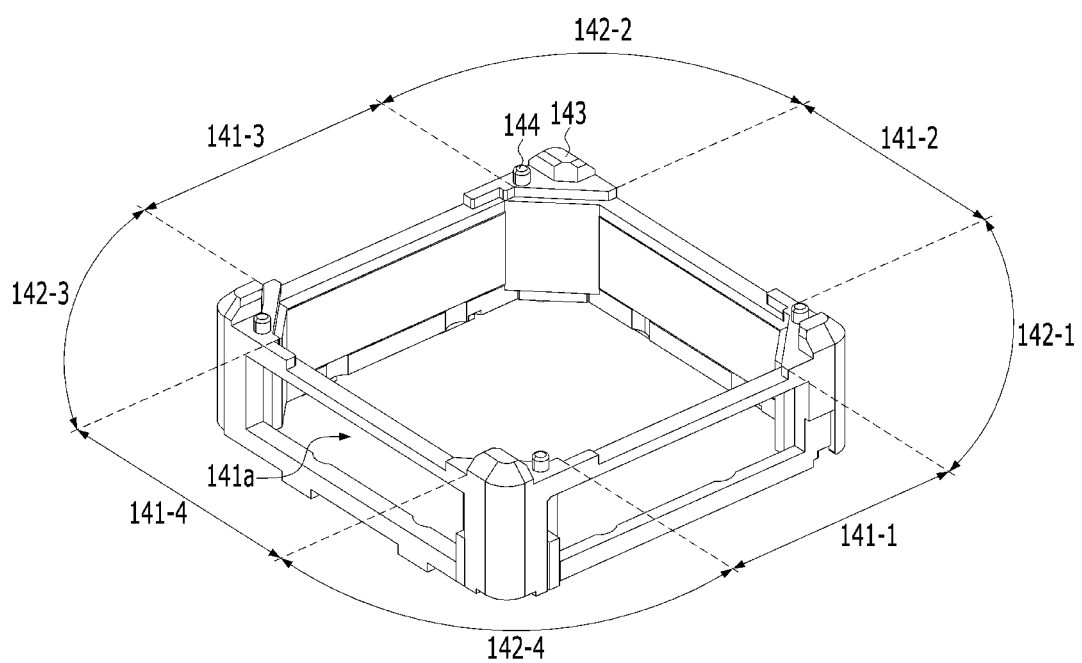
FIG. 4A is a perspective view of the housing shown in FIG. 2.
Figure 4B:
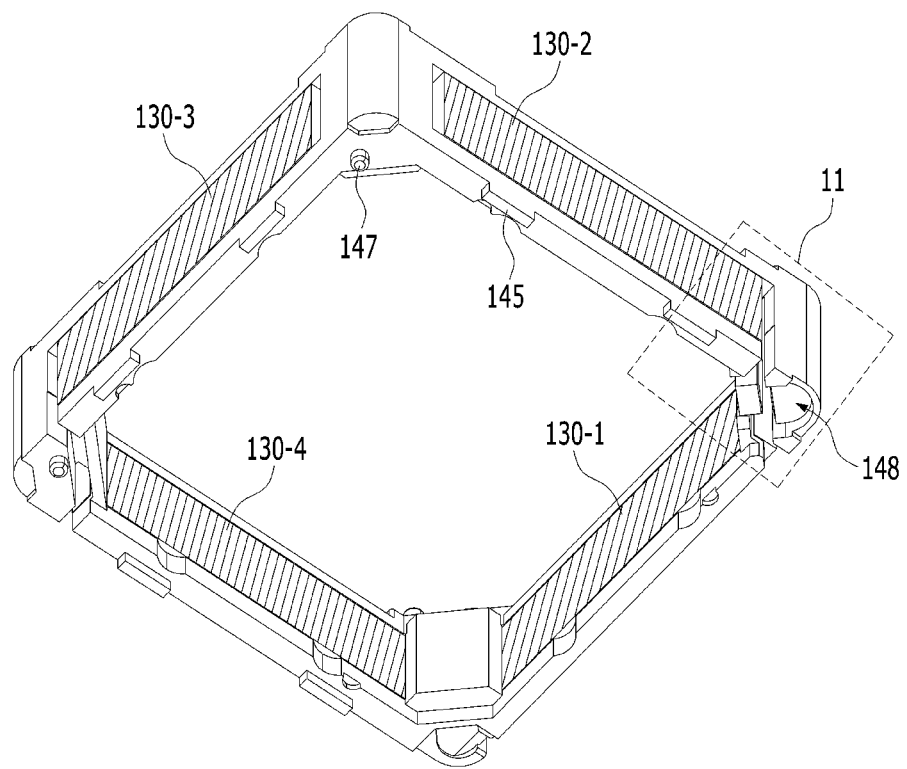
FIG. 4B is a perspective view of the housing and magnets.
Figure 4C:
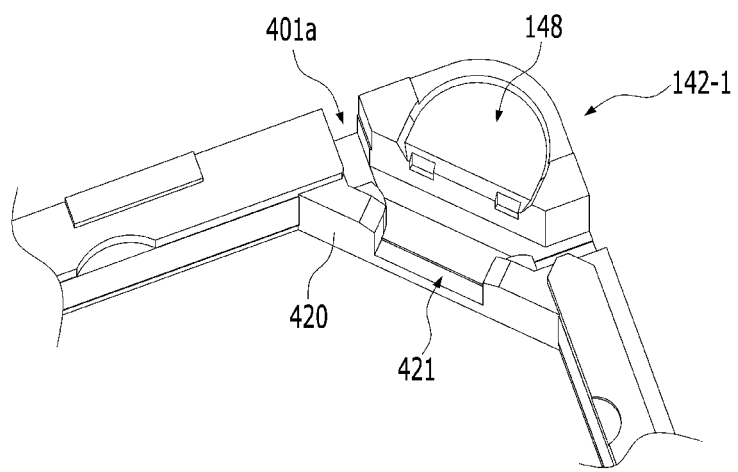
FIG. 4C is an enlarged view of the dotted area of FIG. 4B.

FIG. 1 is a perspective view of a lens moving apparatus 100 according to an embodiment. FIG. 2 is a view illustrating the assembled state of the lens moving apparatus 100 shown in FIG. 1, from which a cover member 300 is removed. FIG. 3A is a perspective view of the bobbin 110 shown in FIG. 2. FIG. 3B is a perspective view of the coil 120 coupled to the bobbin 110 shown in FIG. 2. FIG. 4A is a perspective view of the housing 140 shown in FIG. 2. FIG. 4B is a perspective view of the housing 140 and magnets 130. FIG. 4C is an enlarged view of the dotted area in FIG. 4B.

Referring to FIGS. 1 and 2, the lens moving apparatus 100 may include a bobbin 110, a coil 120, magnets 130, a housing 140, an upper elastic member 150, a lower elastic member 160 and a position sensor 170.

The lens moving apparatus 100 may further include a circuit board 190, which is conductively connected to the position sensor 170. The lens moving apparatus 100 may further include a cover member 300 and a base 210.

The cover member 300 will be described.

The cover member 300 accommodates the components 110, 120, 130, 140, 150, 160, 170 and 190, in the space defined between the cover member 300 and the base 210.

The cover member 300 may take the form of a box that has an open bottom and includes a top plate and side plates. The bottom of the cover member 300 may be coupled to the upper portion of the base 210. The top plate of the cover member 300 may have a polygonal shape, for example, a square or octagonal shape.

The cover member 300 may have an opening formed in the top plate thereof in order to expose a lens (not shown), coupled to the bobbin 110, to outside light. Although the material of the cover member 300 may be a non-magnetic material such as, for example, SUS in order to prevent the cover member 300 from being attracted by the magnets 130, the disclosure is not limited thereto. In another embodiment, the cover member 300 may be formed of a magnetic material, and may thus function as a yoke for increasing the electromagnetic force caused by interaction between the coil 120 and the magnet 130.

Next, the bobbin 110 will be described.

The bobbin 110 may allow a lens or a lens barrel to be mounted therein, may be disposed in the housing 140, and may be moved along the optical axis.

The bobbin 110 may have an opening that allows a lens or a lens barrel to be mounted therein. Although the opening may have a circular shape, an elliptical shape or a polygonal shape, the disclosure is not limited thereto.

Referring to FIGS. 3A and 3B, the bobbin 110 may have at least one groove 113, which is formed in the upper surface thereof and is coupled or secured in a hole 151a in an inner frame 151 of an upper elastic member 150. Furthermore, the bobbin 110 may include at least one protrusion 117, which is disposed on the lower surface thereof and is coupled and secured to a hole 161a in a lower frame 161 of a lower elastic member 160. In another embodiment, the portion of the bobbin 110 that is coupled to the inner frame of the upper elastic member 150 may have a protrusion shape rather than the groove shape.

The bobbin 110 may have a first escape groove 112a, which is formed in a region of the upper surface thereof so as to correspond to or be aligned with a first frame connector 153 of the upper elastic member 150.

Furthermore, the bobbin 110 may have a second escape groove 112b, which is formed in a region of the lower surface thereof so as to correspond to or be aligned with a second frame connector 163 of the lower elastic member 160.

By virtue of the first escape groove 112a and the second escaped groove 112b in the bobbin 110, it is possible to eliminate spatial interference between the first frame connector 153 and the second frame connector 163 and the bobbin 110, and it is thus possible to allow the first frame connector 153 and the second frame connector 163 to be elastically deformed with ease.

In another embodiment, the first escape groove and/or the second escape groove in the bobbin may be obviated by designing each of the first frame connector and the second frame connector and the bobbin so as to prevent interference therebetween.

The bobbin 110 may include a first stopper 114 projecting from the upper surface thereof in an upward direction and a second stopper 116 projecting from the lower surface thereof in a downward direction. The first stopper 114 and the second stopper 116 of the bobbin 110 may serve to prevent the upper surface or the lower surface of the bobbin 110 from directly colliding with the internal wall of the cover member 300 or the upper surface of the base 210 even if the bobbin 110 is moved beyond a specified range due to an external impact or the like when the bobbin 110 is moved in the first direction in order to perform autofocusing.

The bobbin 110 may have at least one groove 105 formed in the side surface or the outer surface thereof so as to allow the coil 120 to be disposed therein.

The coil 120 may be disposed or seated in the groove 105 in the bobbin 110, or may be directly wound along the groove 105 in the bobbin 110 in a clockwise or counterclockwise direction about the optical axis OA.

The shape and number of grooves 105 in the bobbin 110 may correspond to the shape and number of the coils disposed on the outer surface of the bobbin 110. In another embodiment, the bobbin 110 may not have the groove in which the coil is seated, and the coil may be directly wound around and secured to the outer surface of the bobbin 110 without the groove.

The bobbin 110 may include first side portions 110b-1 and second side portions 110b-2.

In another embodiment, the first side portions 110b-1 of the bobbin 110 may be referred to as first side surfaces, and the second side portions 110b-2 may be referred to as second side surfaces.

The first side portions 110b-1 of the bobbin 110 may correspond to or face the magnets 130. Each of the second side portions 110b-2 of the bobbin 110 may be disposed between two adjacent first side portions.

For example, the groove 105 in the bobbin 110 may be formed in the first side portions 110b-1 and the second side portions 110b-2 of the bobbin 110, without being limited thereto.

Next, the coil 120 will be described.

The coil 120 may be a drive coil, which is disposed on the outer surface of the bobbin 110 so as to electromagnetically interact with the magnets 130 disposed on the housing 140.

For example, the coil 120 may be disposed or wound in the groove 105 in the bobbin 110.

In order to create electromagnetic force through interaction with the magnets 130, a drive signal (for example, drive current or voltage) and a sensing signal for sensing a location of the bobbin 110 may be applied to the coil 120.

The drive signal applied to the coil 120 may be a DC signal.

The sensing signal applied to the coil 120 may be an AC signal.

For example, both a drive signal, which is a DC signal, and a sensing signal, which is an AC signal, may be applied to the coil 120.

For example, a sensing signal applied to the coil 120 may be of an AC-current-type. However, the disclosure is not limited thereto, and the sensing signal may be of an AC voltage type. For example, the sensing signal applied to the coil 120 may be a sinusoidal wave or a pulse signal (for example, a pulse width modulation (PWM) signal).

An AF operation unit may be moved in the first direction, for example, in an upward direction (in the +z-axis direction) or in a downward direction (in the −z-axis direction) by virtue of the electromagnetic force resulting from the interaction between the coil 120 and the magnets 130.

By controlling the intensity and/or polarity of a drive signal applied to the coil 120 (for example, the direction in which current flows) and thus controlling the intensity and/or direction of the electromagnetic force resulting from the interaction between the coil 120 and the magnets 130, it is possible to control the movement of the AF operation unit in the first direction, thereby performing an autofocus function.

The AF operation unit may include the bobbin 110, which is elastically supported by the upper elastic member 150 and the lower elastic member 160, and components that are mounted on the bobbin 110 and are moved therewith. For example, the AF operation unit may include the bobbin 110, the coil 120 and/or a lens (not shown) mounted on the bobbin 110.

The coil 120 may be disposed at the bobbin 110 so as to have a closed loop shape.

For example, the coil 120 may have a closed loop shape, which is wound in a clockwise or counterclockwise direction about the optical axis, and may be wound or disposed around the outer surface of the bobbin 110.

In another embodiment, the coil 120 may be embodied as a coil ring, which is wound or disposed in a clockwise or counterclockwise direction about an axis perpendicular to the optical axis. Although the number of coil rings may be equal to the number of magnets 130, the disclosure is not limited thereto.

The coil 120 may be conductively connected to at least one of the upper elastic member 150 or the lower elastic member 160, and may be conductively connected to the circuit board 190 via the upper elastic member 150 or the lower elastic member 160. For example, the coil 120 may be coupled to two of the upper springs of the upper elastic member 150 or to two of the lower springs of the lower elastic member using solder or conductive adhesive, without being limited thereto.

For example, the coil 120 disposed at the bobbin 110 may overlap the magnets 130 in a direction perpendicular to the optical axis.

Furthermore, the coil 120 disposed at the bobbin 110 may overlap the position sensor 170 in a direction perpendicular to the optical axis, without being limited thereto.

Next, the housing 140 will be described.

The housing 140 accommodates therein the bobbin 110, with the coil 120 disposed thereon.

Referring to FIGS. 4A and 4C, the housing 140 may be configured to have the overall shape of a cylinder having an opening therein, and may include side portions 141-1 to 141-4 and corner portions 142-1 to 142-4, which collectively define the opening.

Each of the corner portions 142-1 to 142-4 may be disposed or positioned between two adjacent ones of the side portions 141-1 to 141-4 so as to connect the two adjacent ones of the side portions 141-1 to 141-4 to each other.

In FIG. 4A, the housing 140 may include, for example, a first side portion 141-1, a second side portion 141-2, a third side portion 141-3, a fourth side portion 141-4, a first corner portion 142-1 disposed between the first side portion 141-1 and the second side portion 141-2, a second corner portion 142-2 disposed between the second side portion 141-2 and the third side portion 141-3, a third corner portion 142-3 disposed between the third side portion 141-3 and the fourth side portion 141-3, and a fourth corner portion 142-4 disposed between the fourth side portion 141-4 and the first side portion 141-1.

Although the side portions 141-1 to 141-4 of the housing 140 may correspond to the side portions 110b-1 of the bobbin 110 and the corner portions 142 of the housing 140 may correspond to the corner portions 110b-2 of the bobbin 110, the disclosure is not limited thereto.

The magnets 130 (130-1 to 130-4) may be disposed or mounted on the side portions 141-1 to 141-4 of the housing 140, and the position sensor 170 may be disposed at at least one (for example, 142-1) of the corner portions 142-1 to 142-4 of the housing 140.

Since the position sensor 170 is disposed at the corner portion, spatial interference between the magnet disposed at the side portion and the position sensor is suppressed. Consequently, it is possible to increase the size of the magnet and thus to increase the electromagnetic force resulting from the interaction with the coil.

In order to support or receive the magnets 130-1 to 130-4, the housing 140 may include magnet mounts 141a, which are formed in the side portions 141-1 to 141-4. For example, the magnet mounts 141a may be through holes, which are formed through the side portions 141-1 to 141-4 of the housing 140. However, the disclosure is not limited thereto, and the magnet mounts 141a may be depressed grooves in another embodiment.

The lower portion, the lower end or the lower surface of one of the corner portions of the housing 140 may have formed therein a seating groove 401a in which an extension 190-2 of the circuit board 190 is disposed.

For example, the seating groove 401a may be positioned between the outer surface and the inner surface 420 of the first corner portion 142-1 of the housing 140, and may be depressed from the lower portion, the lower end or the lower surface of the first corner portion 142-1.

For example, the seating groove 401a may be adjacent to a guide groove 148 formed in the first corner portion 142-1 of the housing 140, and may be positioned between the guide groove 148 and the inner surface 420 of the first corner portion 142-1.

For example, the seating groove 401a may have therein at least one opening, which is open at the outer surface of the first corner portion 142-1, in order to allow the extension 190-2 of the circuit board 190 to be easily disposed or mounted therein, without being limited thereto. In another embodiment, the seating groove 401a may not have any openings in the outer surface of the first corner portion 142-1.

Each of the side portions 141-1 to 141-4 of the housing 140 may be disposed parallel to a corresponding one of the side plates of the cover member 300.

Furthermore, the housing 140 may be provided on the upper surface thereof with stoppers 143 so as to prevent the housing 140 from directly colliding with the inner surface of the cover member 300.

For example, the stoppers 143 may be disposed on the upper surface of at least one of the first to fourth corner portions 142-1 to 142-4 of the housing 140, without being limited thereto. In another embodiment, the stoppers may be disposed on the upper surface of at least one of the side portions.

The housing 140 may include at least one protrusion 144 formed on the upper portion, the upper end or the upper surface of the housing 140, which is intended to be coupled to the hole 152a in the first outer frame 152 of the upper elastic member 150. For example, the at least one protrusion 144 may be disposed on the upper surface of one of the corner portions 142-1 to 142-4, without being limited thereto. In another embodiment, the at least one protrusion may also be disposed at the side portions 141-1 to 141-4 of the housing 140.

Furthermore, the housing 140 may include at least one protrusion 147, which is formed on the lower portion, the lower end or the lower surface of the housing 140 so as to be coupled or secured to the hole 162a in the second outer frame 162 of the lower elastic member 160. For example, the at least one protrusion 147 may be disposed on the lower surface of at least one of the corner portions 142-1 to 142-4 of the housing 140, without being limited thereto. In another embodiment, the at least one protrusion may be disposed at the side portions 141-1 to 141-4 of the housing 140.

In order to prevent the lower surface or the bottom of the housing 140 from colliding with the base 210, which will be described later, the housing 140 may include at least one stopper 145 projecting from the lower surface thereof.

The lower portions or the lower surfaces of the corner portions 142-1 to 142-4 of the housing 140 may have formed therein guide grooves 148, which face grooves 212 in the base 210.

For example, by means of an adhesive member, the guide grooves 148 in the housing 140 and the grooves in the base 210 may be coupled to each other, and the housing 140 may be coupled to the base 210.

As illustrated in FIG. 4C, in order to eliminate spatial interference with the position sensor 190, the housing 140 may have a groove 421 formed in the lower portion or the lower end of the first corner portion 142-1.

The groove 421 may have a form depressed from the lower end or the lower surface of the first corner portion 142-1 of the housing 140.

For example, the groove 421 may have an opening, which is open at the inner surface 420 of the first corner portion 142-2, in order to facilitate disposition of the position sensor. Although the groove 421 may have a shape that corresponds to or coincides with that of the position sensor 190, the disclosure is not limited thereto.

Next, the magnets 130 will be described.

The magnets 130 may be disposed at the housing 140 so as to overlap the coil 120 at at least a portion thereof in a direction perpendicular to the optical axis OA at the initial position of the bobbin 110.

The magnets 130 may be fitted or disposed in the magnet mounts 141a of the housing 140, and may be secured to the magnet mounts 141a of the housing 140 using adhesive.

For example, the initial position of the bobbin 110 may be the initial position of the AF operation unit (for example, the bobbin) in the state in which power or a drive signal and a sensing signal are not applied to the coil 120, and may be the position of the AF operation unit when the upper elastic member 150 and the lower elastic member 160 are elastically deformed by only the weight of the AF operation unit.

Furthermore, the initial position of the bobbin 110 may be the position of the AF operation unit when gravity is applied toward the base 210 from the bobbin 110 or toward the bobbin 110 from the base 210. The AF operation unit may include the bobbin 110 and component mounted on the bobbin 110, for example, the coil 120.

In another embodiment, the magnets 130 may be disposed on the outer surface of the side portions 141-1 to 141-4 of the housing 140.

Alternatively, the magnets 130 may also be disposed at the corner portions 142 of the housing 140, and the position sensor 170 may be disposed at one of the side portions 141-1 to 141-4 of the housing 140.

Although each of the magnets 130 may have a shape corresponding to the shape of a corresponding one of the side portions 141-1 to 141-4 of the housing 140, that is, a rectangular shape, the disclosure is not limited thereto. The surface of the magnet 130 that faces the coil 120 may be configured to have a curvature that corresponds to or coincides with the corresponding surface of the coil 120.

Each of the magnets 130 may be a monopolar magnetized magnet, in which the first surface of the magnet 130, which faces the coil 120, becomes an N pole and the opposite (second) surface of the magnet 130 becomes an S pole. However, the disclosure is not limited thereto, and the N pole and the S pole may also be disposed in the reverse fashion.

In another embodiment, each of the magnets 140 may be a bipolar magnetized magnet.

For example, each of the magnets 130 may be a bipolar magnetized magnet, which is divided into two in a direction perpendicular to the optical-axis direction. For example, the magnet 130 may include a first magnet portion, a second magnet portion, and a non-magnetic partition wall disposed between the first magnet portion and the second magnet portion.

For example, the first magnet portion may be positioned at an upper side, and the second magnet portion may be positioned at a lower side. The first magnet portion and the second magnet portion may be spaced apart from each other, without being limited thereto.

The non-magnetic partition wall is a portion that is almost completely non-magnetic and which may include a zone having almost no polarity. The non-magnetic partition wall may be filled with air or may be made of a non-magnetic material.

Although the number of magnets 130 is four in the embodiment, the disclosure is not limited thereto, and the number of magnets 130 may be two or more. Although the surface of the magnet 130 that faces the coil 120 may be formed so as to be planar, the disclosure is not limited thereto, and the first surface may be formed so as to be curved.

The magnets 130 may include at least two magnets, which are disposed on the side portions of the housing 140 and which face each other.

For example, the magnets 130-1 to 130-4 may be disposed at the side portions 141-1 to 141-4 of the housing 140. Two pairs of magnets 130-1 to 130-4, each pair of magnets thereof facing each other, may be disposed at the side portions 141-1 to 141-4 of the housing 140. Here, each of the magnets 130-1 to 130-4 may have an approximately rectangular shape. Alternatively, each of the magnets may have a triangular shape or a rhombic shape.

Although the magnets 130-1 to 130-4 are disposed at the housing 140 in the embodiment shown in FIGS. 4A to 4C, the disclosures is not limited thereto.

In another embodiment, the housing 140 may be omitted, and the magnets 130-1 to 130-4 and the position sensor 170 may be disposed at the cover member 300.

In a further embodiment, the housing 140 may not be omitted, and the magnets 130-1 to 130-4 and the position sensor 170 may be disposed at the cover member 300.

When the magnets and the position sensor are disposed at the cover member, the magnets may be disposed at the side plates of the cover member 300, and the position sensor may be disposed at the corner portion of the cover member 300. Here, the corner portion of the cover member may be positioned between the side plates of the cover member 300.

The coil 120 may be moved in conjunction with the bobbin 110 in the optical-axis direction OA by the interaction between the coil 120 and the magnet 130. The position sensor 170 may detect the intensity of a magnetic field generated by the coil 120, which is moved in the optical-axis direction, and may output an output signal according to the result of detection.

For example, a controller 830 of the camera module 200 or a controller 780 of a terminal 200A may detect displacement of the bobbin 110 in the optical-axis direction based on the output signal output from the position sensor 170.

Next, the position sensor 170 and the circuit board 190 will be described.

Figure 5:
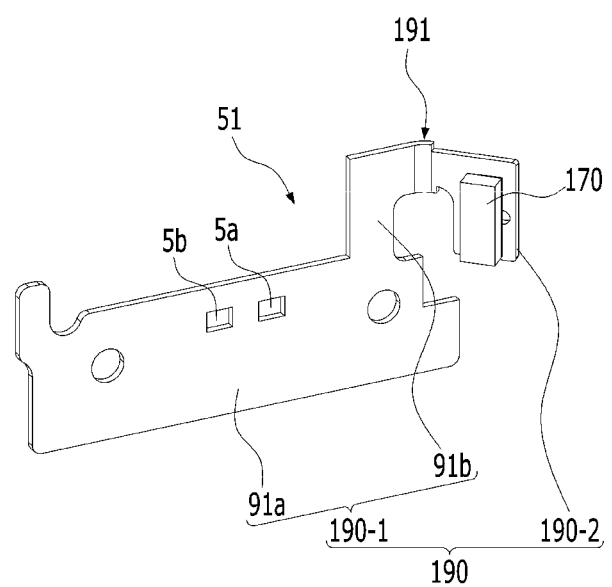
FIG. 5 illustrates a position sensor mounted on a circuit board.

FIG. 5 illustrates the position sensor 170 mounted on the circuit board 190.

Referring to FIG. 5, the circuit board 190 may include a body 190-1 and the extension 190-2 connected to the body 190-1.

The body 190-1 may be provided with a plurality of terminals 19-1 to 19-$n$ (n being a natural number greater than 1) (see FIG. 2). For example, the plurality of terminals 19-1 to 19-$n$ may be arranged in a line at the lower end of the outer surface of the body 190-1. Here, the term "terminals" may be used interchangeably with the term "pads".

The body 190-1 may be disposed on the outer surface of one (for example, 142-2) of the side portions of the housing 140, which is adjacent to the first corner portion 142-1 of the housing 140.

The body 190-1 may include a lower portion 91a including the terminals 19-1 to 19-$n$, and an upper portion 91b projecting upwards from the lower portion 91a.

The lower portion 91a of the body 190-1 may have therein a groove or opening 51, through which a magnet 130-2 disposed at one of the side portions of the housing 140 is exposed.

The lower portion 91a of the body 190-1 may be provided with couplers 5a and 5b, which are connected to the outer frame of the lower springs 160a and 160b. For example, each of the couplers 5a and 5b may have the form of a through hole. However, the disclosure is not limited thereto, and the coupler may have the form of a groove.

The upper portion 91b of the body 190-1 may be connected to a region of the upper surface of the lower portion 91a of the body 190-1, and may be connected to the extension 190-2.

The extension 190-2 may be disposed at the first corner portion 142-1, and may be bent from one end of the body 190-1 (for example, one end of an upper portion 91b of the body 190-1) disposed at the side portion (for example, 142-2) of the housing 140. For example, a bent portion 191 may be formed between the upper portion 91b of the body 190-1 and the extension 190-2.

Referring to FIG. 4C, the extension 190-2 may be disposed in the seating groove 401a in the housing 140. For example, the extension 190-2 may be disposed in the seating groove 401a in the housing 140.

The first surface of the extension 190-2 may be provided with pads P1 to P4 (see FIG. 6), which are conductively connected to the position sensor 170. Here, the term "pads" may be used interchangeably with the term "bonding portions", "electrodes", "conductive layers" or "terminals".

For example, each of the first to fourth pads P1 to P4 of the circuit board 190 may be conductively connected to a corresponding one of the plurality of terminals 19-1 to 19-$n$ via a wire or a circuit pattern provided at the circuit board 190.

The position sensor 170 may be disposed at the first surface or the inner surface of the extension 190-2 of the circuit board 190. Here, the first surface of the extension 190-1 mounted on the housing 140 may be the surface that faces the inner surface of the housing 140 or the outer surface of the bobbin 110.

The position sensor 170 may be disposed at one (for example, 142-1) of the corner portions of the housing 140, and may detect the location of the bobbin 110 by means of a magnetic field generated by the coil 120.

For example, at the initial position of the bobbin 110, the position sensor 170 may overlap the coil 120 in a direction perpendicular to the optical axis or in a direction toward the second side portion 110b-2 of the bobbin 110 corresponding to the first corner portion 142-1 from the first corner portion 142-1 of the housing 140, without being limited thereto.

In another embodiment, at the initial position, the position sensor 170 and the coil 120 may not overlap each other in a direction perpendicular to the optical axis.

The position sensor 170 may detect the intensity of a magnetic field generated by the coil 120 mounted on the bobbin 110 when the bobbin 110 is moved, and may output an output signal (for example, an output voltage) corresponding to the result of detection.

The position sensors 170 may be embodied as a driver including a hall sensor, or may be embodied as a position detection sensor, such as a hall sensor, alone.

For example, the position sensor 170 may be a TMR (tunnel magnet resistance) linear magnetic field sensor.

The position sensor 170 may include four terminals (for example, two input terminals and two output terminals). The two terminals (for example, the input terminals) of the position sensor 170 may be conductively connected to two pads (for example, P1 and P2) of the first to fourth pads P1 to P4 of the circuit board 190. The two remaining terminals (for example, the output terminals) of the position sensor 170 may be conductively connected the two remaining pads (for example, P3 and P4) of the first to fourth pads P1 to P4 of the circuit board 190.

For example, a drive signal may be provided to the position sensor 170 via the first and second pads P1 and P2 of the circuit board 190, and the output from the position sensor 170 may be transmitted to the circuit board 190 via the first and second pads P1 and P2 of the circuit board 190.

When the position sensor 170 is a driver IC including a hall sensor, the driver IC may include four terminals for transmitting and receiving signals for I2C communication.

In another embodiment, the position sensor 170 may be disposed at the second surface of the extension 190-2, without being limited thereto. Here, the second surface of the extension 190-2 may be the surface opposite the first surface of the extension 190-2.

Next, the upper elastic member 150 and the lower elastic member 160 will be described.

Figure 6:
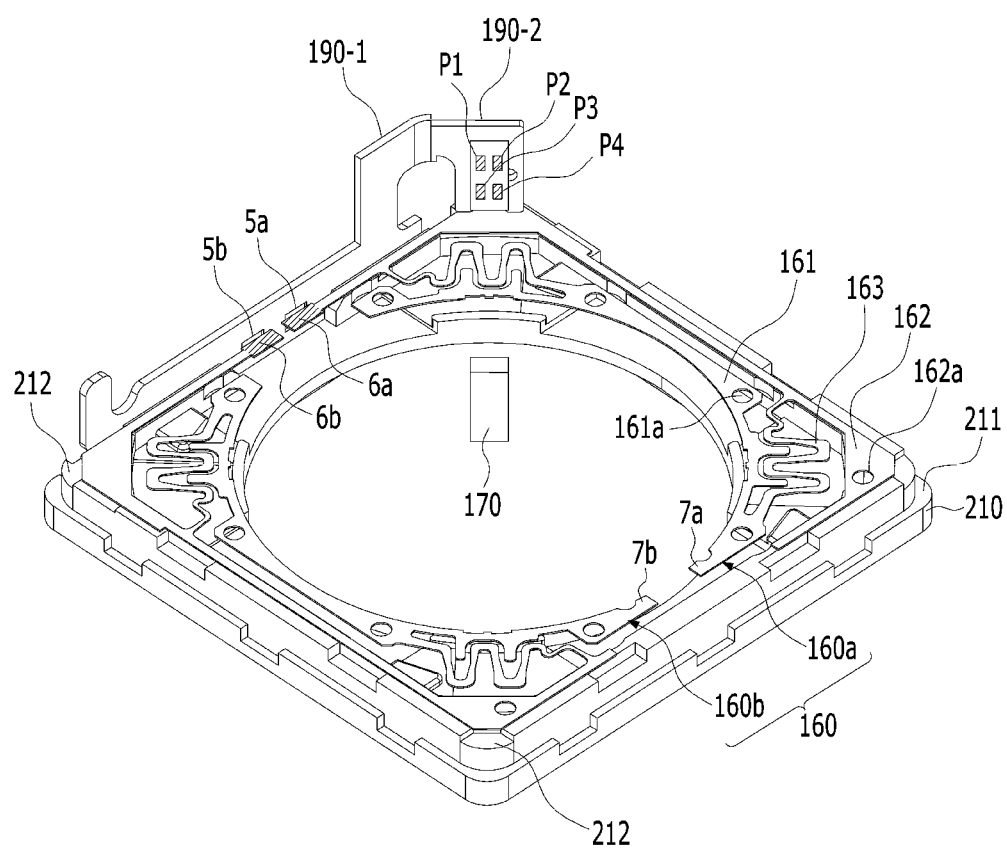
FIG. 6 illustrates a base, a lower elastic member, the circuit board and a position sensor.

FIG. 6 illustrates the base 210, the lower elastic member 160, the circuit board 190 and the position sensor 170.

Referring to FIGS. 2 and 6, the upper elastic member 150 and the lower elastic member 160 may be coupled both to the bobbin 110 and to the housing 140 so as to support the bobbin 110. Here, the term "elastic member" may be used interchangeably with the term "elastic unit", "elastic body", "spring" or the like.

For example, the upper elastic member 150 may be coupled both to the upper portion, the upper surface or the upper end of the bobbin 110 and to the upper portion, the upper surface or the upper end of the housing 140, and the lower elastic member 160 may be coupled both to the lower portion, the lower surface or the lower end of the bobbin 110 and to the lower portion, the lower surface or the lower end of the housing 140.

At least one of the upper elastic member 150 and the lower elastic member 160 may be divided or separated into two or more.

Although the upper elastic member 150 is not divided and the lower elastic member 160 is divided into two in FIGS. 2 and 6, the disclosure is not limited thereto.

Although each of the upper elastic member 150 and the lower elastic member 160 may be embodied as a leaf spring, the disclosure is not limited thereto. Each of the first and lower elastic members 150 and 160 may be embodied as a coil spring, a suspension wire or the like.

The upper elastic member 150 may include a first inner frame 151 coupled to the upper portion, the upper surface or the upper end of the bobbin 110, a first outer frame 152 coupled to the upper portion, the upper surface or the upper end of the housing 140, and a first frame connector 153 connecting the first inner frame 151 to the first outer frame 152. Here, the term "inner frame" may be used interchangeably with the term "inner portion", the term "outer frame" may be used interchangeably with the term "outer portion", and the term "frame connector" may be used interchangeably with the term "connecting portion".

The first inner frame 151 of the upper elastic member 150 may have formed therein the hole 151a, which is coupled to the groove 113 in the bobbin 110, and the first outer frame 152 may have formed therein the hole 152a, which is coupled to the protrusion 144 of the housing 140.

The lower elastic member 160 may include the first lower spring 160a and the second lower spring 160b, which are spaced apart from each other.

Each of the first and second lower springs 160a and 160b may include a second inner frame 161 coupled to the lower portion, the lower surface or the lower end of the bobbin 110, a second outer frame 162 coupled to the lower portion, the lower surface or the lower end of the housing 140, and a second frame connector 163 connecting the second inner frame 161 to the second outer frame 162.

The second inner frame 161 of each of the first and second lower springs 160a and 160b may have formed therein the hole 161a, which is coupled to the protrusion 117 of the bobbin 110 using solder or a conductive adhesive member. The second outer frame 162 of each of the first and second lower springs 160a and 160b may have formed therein the hole 162a, which is coupled to the protrusion 147 of the housing 140.

One end of the second inner frame 161 of the first lower spring 160a may be provided with a first bonding portion 7a, to which one end of the coil 120 is coupled using solder or conductive adhesive. One end of the second inner frame 161 of the second lower spring 160b may be provided with a second bonding portion 7b, to which the other end of the coil 120 is coupled using solder or conductive adhesive.

One end of the second outer frame 161 of the first lower spring 160a may be provided with a third bonding portion 6a, to which the first coupler 5a of the circuit board 190 is coupled using solder or conductive adhesive. One end of the second outer frame 161 of the second lower spring 160b may be provided with a fourth bonding portion 6b, to which the second coupler 5b of the circuit board 190 is coupled using solder or conductive adhesive.

The third bonding portion 6a and the fourth bonding portion 6b may be conductively connected to two terminals, among the plurality of terminals 19-1 to 19-n of the circuit board 190.

A drive signal and a sensing signal may be provided to the coil 120 via the circuit board 190 and the first and second lower springs 160a and 160b.

For example, the third bonding portion 6a and the fourth bonding portion 6b may be positioned adjacent to the second side portion (for example, 141-2) of the housing 140 at which the body 190-1 of the circuit board 190 is disposed.

Furthermore, the first bonding portion 7a and the second bonding portion 7b may be positioned adjacent to the fourth side portion 142-4 of the housing 140, which faces the second side portion (for example, 142-2) of the housing 140, at which the body 190-1 of the circuit board 190 is disposed.

Each of the first and second frame connectors 153 and 163 of the upper and lower elastic members 150 and 160 may be bent or curved (into a curved shape) at least once so as to define a predetermined pattern.

The upward and/or downward movement of the bobbin 110 in the first direction may be flexibly (or elastically) supported by virtue of positional variation and fine deformation of the first and second frame connectors 153 and 163.

In order to absorb or dampen vibrations of the bobbin 110, the lens moving apparatus 100 may further include first dampers (not shown), each of which is disposed between the upper spring 150 and the housing 140.

For example, the first dampers (not shown) may be disposed in the space between the first frame connector 153 of the upper spring 150 and the housing 140.

The lens moving apparatus 100 may include second dampers (not shown), each of which is disposed between the second frame connector 163 of each of the first and second lower springs 160a and 160b and the housing 140.

For example, a damper (not shown) may also be disposed between the inner surface of the housing 140 and the outer peripheral surface of the bobbin 110.

Next, the base 210 will be described.

The base 210 may have an opening corresponding to the opening in the bobbin 110 and/or the opening in the housing 140, and may be configured to have a shape that coincides with or corresponds to the shape of the cover member 300, for example, a square shape.

The base 210 may include a step 211, which is formed at the lower end of the side surface thereof and to which an adhesive is applied when the cover member 300 is adhesively attached to the base 210. The step 211 may guide the cover member 300, which is coupled to the upper side thereof, and may face the lower ends of the side plates of the cover member 300.

The base 210 may be disposed under the bobbin 110 and the housing 140.

For example, the base 210 may be disposed under the lower elastic member 160.

The corners of the upper surface of the base 210 may have formed therein grooves 212 corresponding to the guide grooves 148 in the housing 140.

Figure 7:
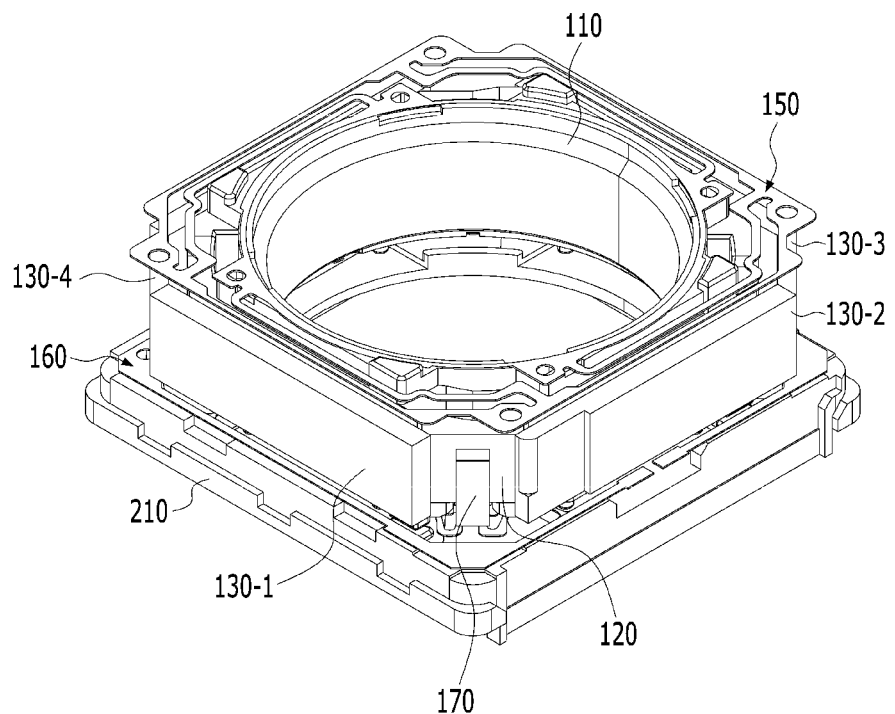
FIG. 7 illustrates the arrangement of the coil and the magnets.
Figure 8A:
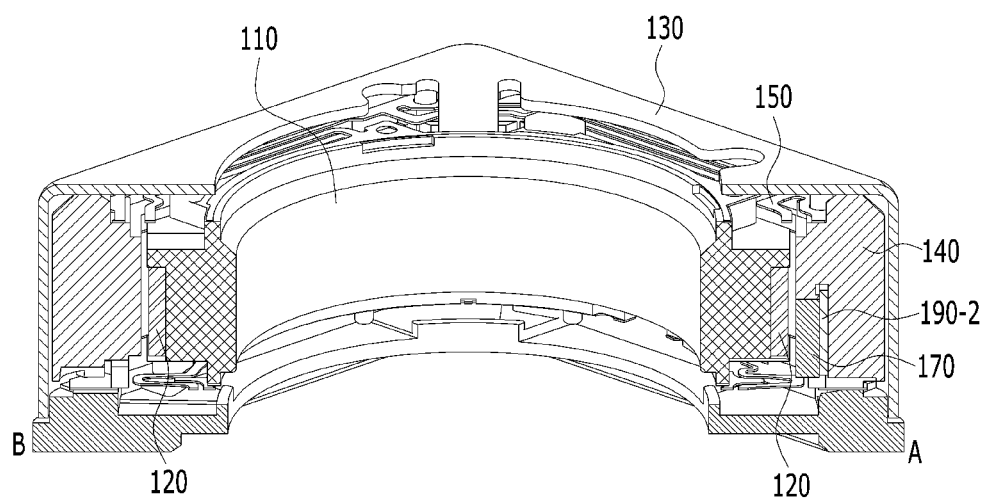
FIG. 8A is a cross-sectional view of the lens moving apparatus shown in FIG. 2, taken along line A-B.
Figure 8B:
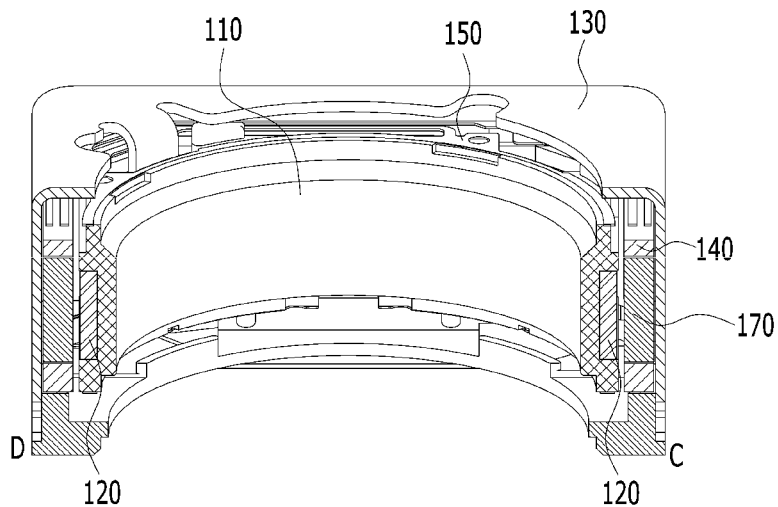
FIG. 8B is a cross-sectional view of the lens moving apparatus shown in FIG. 2, taken along line C-D.

FIG. 7 illustrates the arrangement of the coil 120 and the magnets 130-1 to 130-4. FIG. 8A is a cross-sectional view of the lens moving apparatus 100 shown in FIG. 2, which is taken along line A-B. FIG. 8B is a cross-sectional view of the lens moving apparatus 100 shown in FIG. 2, which is taken along line C-D. FIGS. 8A and 8B illustrate the lens moving apparatus together with the cover member 300 shown in FIG. 1.

Referring to FIGS. 7, 8A and 8B, at the initial position of the bobbin 110, the position sensor 170 may overlap the coil 120 in a direction perpendicular to the optical axis.

The position sensor 170 may be disposed adjacent to at least one of the first magnet 130-1 and the second magnet 130-2.

For example, the position sensor 170 may not overlap at least one of the first magnet 130-1 and the second magnet 130-1 in a direction toward the optical axis OA from the position sensor 170.

For example, the position sensor 170 may be disposed adjacent to the first magnet 170, and may not overlap the first magnet in a direction toward the optical axis OA from the position sensor 170.

For example, the position sensor 170 may be positioned between the first magnet 130-1 and the second magnet 130-2. The position sensor 170 may not overlap the first to fourth magnets 130-1 to 130-4 in a direction toward the optical axis OA from the position sensor 170.

For example, at the initial position of the bobbin 110, the position sensor 170 may overlap the coil 120 in a direction toward the second side portion 110b-2 of the bobbin 110 corresponding to the first corner portion 142-1 of the housing 140 from the first corner portion 142-1 of the housing 140 at which the position sensor is disposed.

For example, the position sensor 170 may be disposed at the first corner portion 142-1 of the housing 140, which is positioned between the first side portion 141-1 of the housing 140, at which the first magnet 130-1 is disposed, and the second side portion 141-2 of the housing 140, at which the second magnet 130-2 is disposed.

The position sensor 170 may not overlap the magnets 130-1 to 130-4 in a direction toward the second side portion 110b-2 of the bobbin corresponding to the first corner portion 142-1 of the housing 140 from the first corner portion 142-1 of the housing 140. Consequently, it is possible to reduce influence on the position sensor 170 caused by a magnetic field generated from the magnets 130-1 to 130-4 and interference with the magnetic field, and it is thus possible to suppress errors in AF operation attributable to the interference with the magnetic field of the magnets 130-1 to 130-4.

In another embodiment, the magnets may be disposed at the corner portions of the housing 140, and the position sensor 170 may be positioned at one of the side portions of the housing 140.

In a further embodiment, the magnets may be disposed at the corner portions of the housing 140, and the position sensor may be disposed at one of the corner portions of the housing. In this case, one of the magnet and the position sensor may be positioned at an upper portion of one of the corner portions, and the other of the magnet and the position sensor may be positioned at a lower portion of one of the corner portions.

In a further embodiment, the magnets may be disposed at the side portions of the housing, and the position sensor may be disposed at one of the side portions of the housing. In this case, one of the magnet and the position sensor may be positioned at an upper portion of one of the side portions, and the other of the magnet and the position sensor may be positioned at a lower portion of the one side portion.

Figure 9:
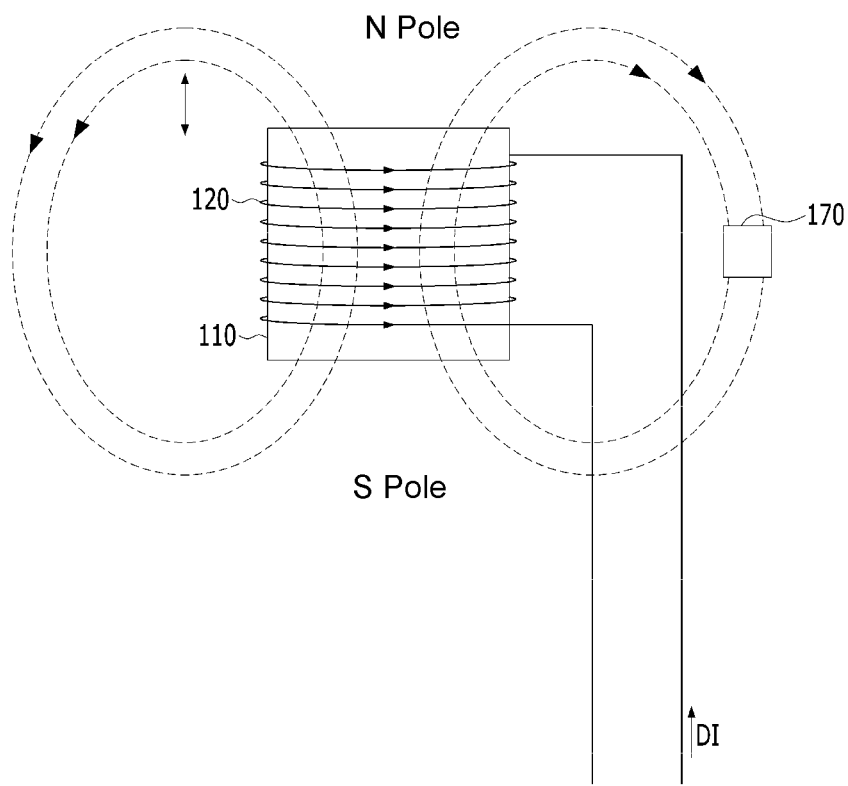
FIG. 9 illustrates a magnetic field generated by a signal applied to the coil.

FIG. 9 illustrates a magnetic field generated by a signal DI applied to the coil 120.

Referring to FIG. 9, when the sensing signal DI is applied to the coil 120, a magnetic field may be generated around the coil 120 in accordance with Ampere's law. The position sensor 170 may detect the intensity of the magnetic field generated by the coil 120.

For example, the sensing signal DI may be a current-type signal. However, the disclosure is not limited thereto, and the sensing signal may be a voltage-type signal.

When the coil 120 is wound around the bobbin 110 multiple turns, a solenoid magnetic field may be generated by the sensing signal DI, as illustrated in FIG. 9. The solenoid magnetic field may be proportional to the number of times the coil 120 disposed at the bobbin 110 is wound and the intensity of the sensing signal DI.

A drive signal may be applied to the coil 120 so as to the electromagnetic force resulting from the interaction with the magnets 130-1 to 130-4. By virtue of the electromagnetic force, the bobbin 110 may be moved in the optical-axis direction (for example, in a +z-axis direction or in a −z-axis direction).

As the bobbin 110 is moved, the intensity of the magnetic field of the coil 120, which is detected by the position sensor 170, may vary, and the output of the sensor 170 may also vary according to the variation in the magnetic field. The position sensor 170 may detect the intensity of a magnetic field of the magnets 130 (or variation in the magnetic field) and the intensity of a magnetic field generated by the coil 120 (or variation in magnetic field).

Figure 10A:
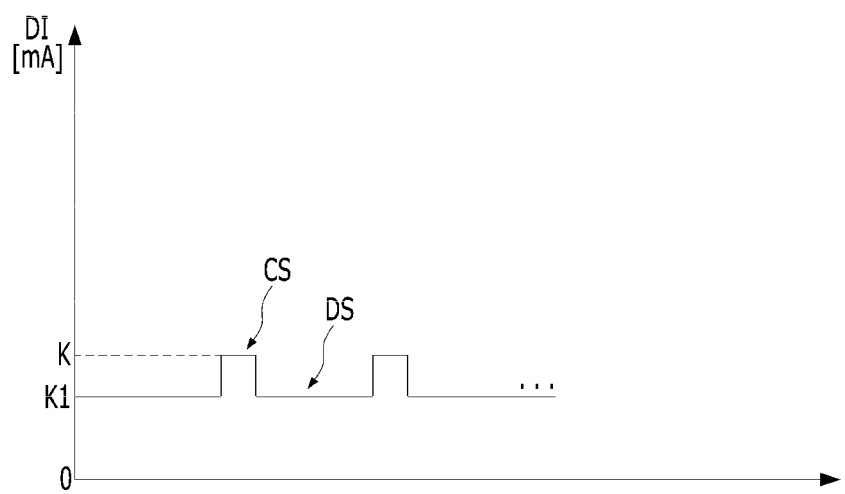
FIG. 10A illustrates an embodiment of a signal applied to the coil.

FIG. 10A illustrates an embodiment of a signal DI applied to the coil 120. In FIG. 10A, the y axis may indicate the intensity of the signal DI, and the x axis may indicate time.

Referring to FIG. 10A, the signal DI may include a drive signal DS, which is a DC signal (for example, a DC-current-type signal), and a sensing signal CS, which is an AC signal (for example, an AC-current-type signal).

For example, the drive signal DS and the sensing signal CS may be simultaneously applied. For example, the sensing signal CS may be provided in the state of overlapping the drive signal DS.

For example, the intensity K1 of the drive signal DS may be increased or decreased for the purpose of AF operation. For example, the maximum value of the sensing signal CS may be constant.

For example, the maximum value K of the sensing signal CS may be greater than the intensity K1 of the drive signal DS, and the difference between the maximum value K of the sensing signal CS and the intensity K of the drive signal DS may be constant.

For example, the difference (K−K1) between the maximum value K of the sensing signal CS and the intensity K1 of the drive signal DS may be 20 [mA]~100 [mA], without being limited thereto.

When the difference (K−K1) is less than 20 [mA], the output of the sensor 170 corresponding to the result of detection of the intensity of the magnetic field generated by the coil 120 may be lowered, thus causing difficulty in sensing. When the difference (K−K1) is greater than 100 [mA], power consumption may be increased.

Figure 10B:
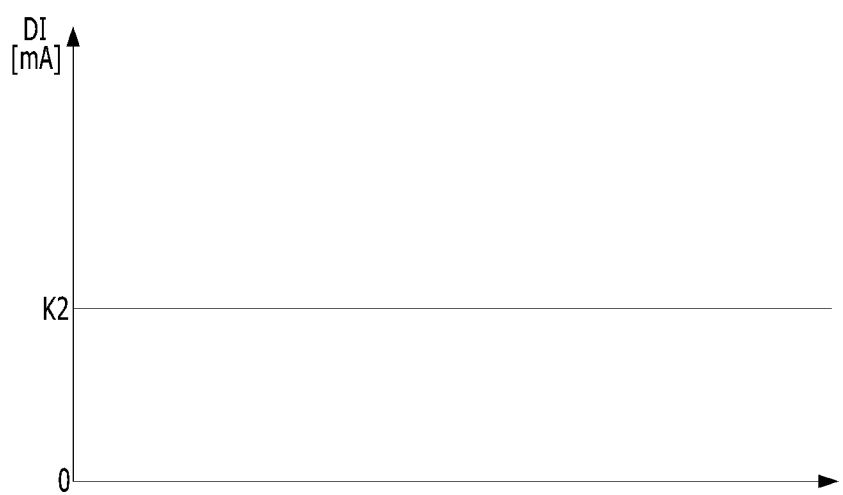
FIG. 10B illustrates another embodiment of a signal applied to the coil.

FIG. 10B illustrates another embodiment of the signal DI applied to the coil 120.

Referring to FIG. 10B, the signal DI may be a DC signal (for example, a DC-current-type signal).

Although the signal DI is similar to the drive signal DS, which is a DC signal for interaction with the magnets 130-1 to 130-4, because the signal DI is a DC signal, the intensity K2 of the signal DI may be greater than the intensity K1 of the drive signal DS, which has been described in FIG. 10A, in order to enable the position sensor 170 to detect variation in the intensity of the magnetic field of the coil 120 according to movement of the bobbin 110.

For example, the intensity K1 of the drive signal DS shown in FIG. 10A may be 50 [mA]~70 [mA], and the intensity K2 of the signal DI shown in FIG. 10B may be 80 [mA]~120 [mA].

For example, in order to improve the sensitivity of the position sensor 170, the frequency of the sensing signal CS applied to the coil 120 may be equal to or greater than ½ of the magnetic resonant frequency of the coil 120 but may be equal to or less than twice the magnetic resonant frequency of the coil 120.

For example, in order to improve the sensitivity of the position sensor 170, the frequency of the sensing signal CS applied to the coil 120 may be equal to the magnetic resonant frequency of the coil 120.

Figure 10C:
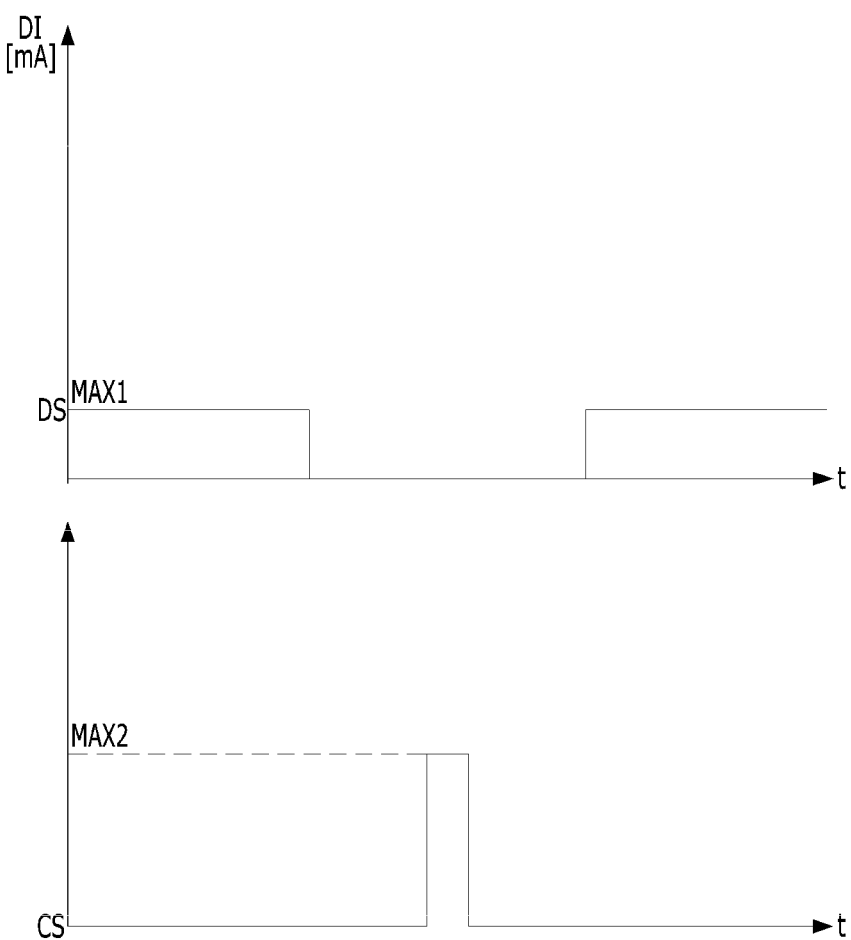
FIG. 10C illustrates a further embodiment of a signal applied to the coil.

FIG. 10C illustrates a further embodiment of the signal DI applied to the coil 120.

Referring to FIG. 10C, each of the drive signal DS and the sensing signal CS may be an AC-current-type signal.

For example, the drive signal DS may be a pulse signal or a PWM (pulse width modulation) signal, and the sensing signal CS may be a pulse signal, a PWM signal or an impulse signal.

The drive signal DS and the sensing signal CS may be provided to the coil 120 in a time-division manner, and the maximum value MAX2 of the sensing signal CS may be greater than the maximum value MAX1 of the drive signal DS (MAX2>MAX1). In another embodiment, the maximum value MAX2 may be equal to the maximum value MAX1.

The period of the sensing signal CS may be shorter than the period of the drive signal DS. In other words, the frequency of the sensing signal CS may be higher than the frequency of the drive signal DS. For example, the frequency of the drive signal DS may be equal to or higher than 300 kHz but be lower than 1 MHz, and the frequency of the sensing signal CS may be equal to or higher than 1 MHz but be equal to or lower than 4 MHz, without being limited thereto.

The position sensor 170 may generate a first output (for example, a first output voltage) corresponding to the result of detection of the first magnetic field generated by the drive signal DS, and may generate a second output (for example, a second output voltage) corresponding to the result of detection of the second magnetic field generated by the sensing signal CS.

For example, the position sensor 170 may output a first output voltage and a second output voltage, which are different from each other in frequency and intensity, in a time-division manner.

For example, because the intensity of the sensing signal CS is greater than the intensity of the drive signal DS, the second output voltage output from the position sensor 170 may be higher than the first output voltage.

A controller of a camera module or an optical device is capable of detecting displacement of the bobbin 110 based on the second output voltage of the position sensor 170, thereby improving sensing sensitivity.

For example, each of the drive signal and the sensing signal may be a PWM signal, and the duty ratio of the PWM signal, which is the sensing signal, may be less than the duty ratio of the PWM signal, which is the drive signal, without being limited thereto. The embodiment is capable of reducing power consumption by making the duty ratio of the PWM signal, which is the sensing signal, less than the duty ratio of the PWM signal, which is the drive signal.

Figure 11:
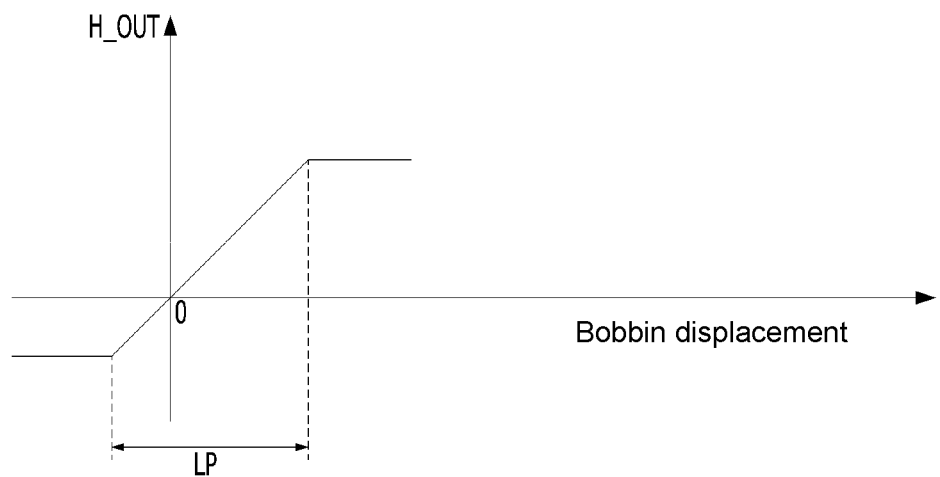
FIG. 11 illustrates the output of the position sensor for detecting a magnetic field of the coil according to displacement of the bobbin.

FIG. 11 illustrates the output of the position sensor for detecting a magnetic field of the coil 120 according to displacement of the bobbin 110.

Referring to FIG. 11, when the signal DI shown in FIG. 10A or 10B is applied to the coil 120, a magnetic field may be generated by the coil 120. Consequently, displacement of the bobbin 110 may vary by the electromagnetic force resulting from the interaction between the signal DI and the magnets 130-1 to 130-4, and the output (H_OUT) of the position sensor 170 may vary by variation of displacement of the bobbin 110 (or movement of the bobbin 110), as illustrated in FIG. 11.

An AF feedback operation may be performed in a linear zone LP in which the output of the position sensor 170 according to the movement of the bobbin 110 is linear. Accordingly, the output signal of the position sensor 170 may include the zone LP, in which the output varies linearly as the bobbin 110 is moved.

Figure 12A:
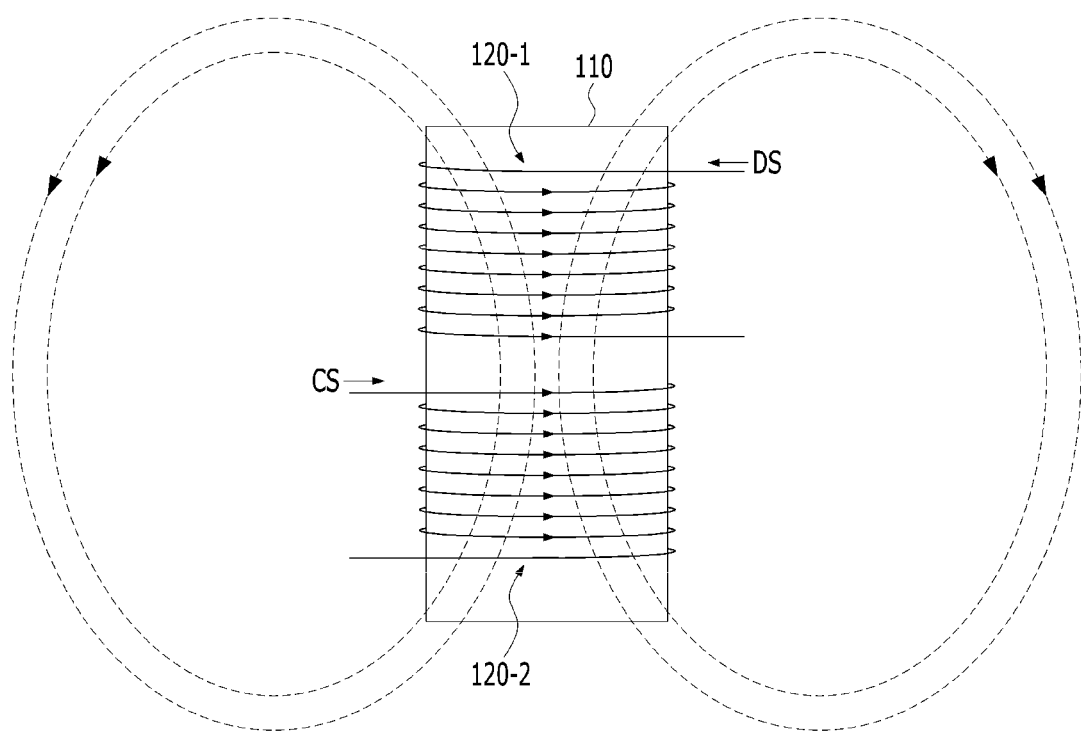
FIG. 12A illustrates a modification of the coil shown in FIG. 9.
Figure 12B:
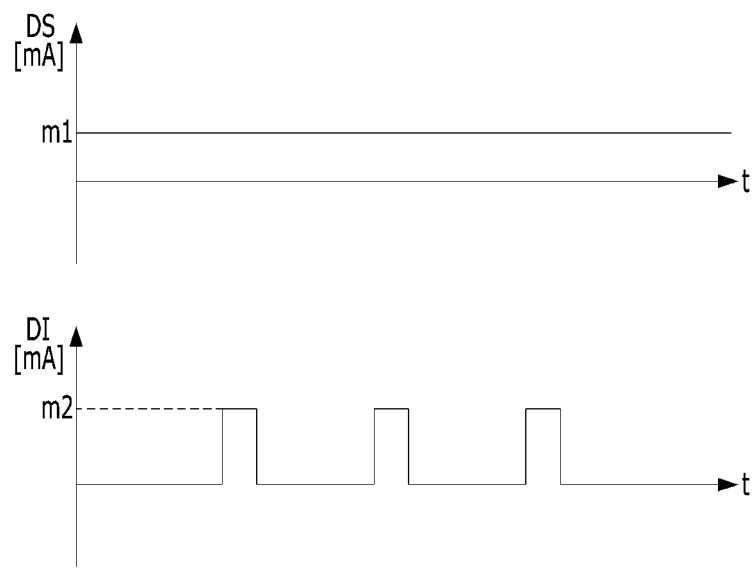
FIG. 12B illustrates a drive signal applied to the first coil and a sensing signal applied to the second coil, which are shown in FIG. 12A.

FIG. 12A illustrates a modification of the coil 120 shown in FIG. 9. FIG. 12B illustrates a drive signal DS applied to a first coil 120-1 shown in FIG. 12A and a sensing signal CS applied to a second coil 120-2 shown in FIG. 12A.

Referring to FIGS. 12A and 12B, the lens moving apparatus 100 may include the first coil 120-1 and the second coil 120-2 in place of the coil 120.

The first coil 120-1 may be conductively connected to two selected from among the upper springs and the lower springs, and the two selected springs may be conductively connected to the circuit board 190 and may then be conductively connected to two of the terminals of the circuit board 190.

The second coil 120-2 may be conductively connected to two other springs of the upper springs and the lower springs, and the two other springs may be conductively connected to the circuit board 190 and may then be conductively connected to two other terminals among the terminals of the circuit board 190.

For example, the first coil 120-1 may be connected to two upper springs, and the second coil 120-2 may be connected to two lower springs.

The drive signal DS may be applied to the first coil 120-1 via the circuit board 190, and the sensing signal CS may be applied to the first coil 120-2 via the circuit board 190.

The first coil 120-1 may have a closed loop shape, for example, a ring shape, which is prepared by winding the coil around the side surface or the outer circumferential surface of the bobbin 110 clockwise or counterclockwise about the optical axis.

The second coil 120-2 may have a closed loop shape, for example, a ring shape, which is prepared by winding the coil around the side surface or the outer circumferential surface of the bobbin 110 clockwise or counterclockwise about the optical axis.

The second coil 120-2 may be positioned under the first coil 120-1, and the first coil 120-1 and the second coil 120-2 may be conductively isolated from each other. In another embodiment, the second coil 120-2 may be positioned above the first coil 120-1.

The drive signal DS applied to the first coil 120-1 may be a DC signal (for example, a DC-current-type signal or a DC voltage-type signal), and the sensing signal CS applied to the second coil 120-1 may be an AC signal (for example, a sinusoidal signal or a pulse signal).

For example, in order to improve the sensing sensitivity of the position sensor 170, the maximum value m2 of the sensing signal CS may be greater than the intensity m1 of the drive signal CS (m2>m1), without being limited thereto. In another embodiment, the maximum value m2 may be equal to or less than the intensity m1 (m2≤m1).

The position sensor 170 may detect a magnetic field generated by the first coil 120-1 in response to the drive signal DS and a magnetic field generated by the second coil 120-2 in response to the sensing signal CS, and may output an output signal corresponding to the result of the detection.

The intensity of the drive signal DS applied to the first coil 120-1 may be controlled so as to be increased or decreased for AF operation. Consequently, the intensity of the magnetic field generated by the first coil 120-1 may vary.

Meanwhile, because the sensing signal CS applied to the second coil 120-2 may have a constant maximum value m2 and period, the intensity of the magnetic field generated by the second coil 120-2 may be constant.

For example, the number of times the second coil 120-2 is wound may be greater than the number of times the first coil 120-1 is wound. The reason for this is to increase the intensity of the magnetic field generated by the second coil 120-2 and consequently to increase the intensity of the magnetic field detected by the position sensor 170, thereby improving the sensitivity of the position sensor 170.

For example, the direction in which the current of the drive signal DS flows along the first coil 120-1 may be the same as the direction in which the current of the sensing signal CS flows along the second coil 120-2 (for example, counterclockwise direction). As a result, the first magnetic field generated by the first coil 120-1 and the second magnetic field generated by the second coil 120-2 may be reinforced by each other.

For example, the first magnetic field of the first coil 120-1 and the second magnetic field of the second coil 120-2 may be generated in a direction such that the two magnetic fields are reinforced by each other. As a result, the intensity of the magnetic field detected by the position sensor 170 may be increased, and the sensitivity of the position sensor 170 may be improved.

In another embodiment, the first magnetic field of the first coil 120-1 and the second magnetic field of the second coil 120-2 may be generated in directions such that the two magnetic fields counteract each other.

For example, in order to improve the sensitivity of the position sensor 170, the frequency of the sensing signal CS applied to the coil 120 may be equal to or greater than ½ of the magnetic resonant frequency of the second coil 120-2 but equal to or less than twice the magnetic resonant frequency of the second coil 120-2.

For example, in order to improve the sensitivity of the position sensor 170, the frequency of the sensing signal CS applied to the second coil 120-2 may be equal to the magnetic resonant frequency of the second coil 120-2.

In another embodiment, each of the drive signal applied to the first coil 120-1 and the sensing signal applied to the second coil 120-2 may be an AC signal. For example, the drive signal may be a pulse signal or a PWM (pulse width modulation) signal, and the sensing signal may be a pulse signal, a PWM signal or an impulse signal.

The drive signal DS and the sensing signal CS may be applied to the coil 120 in a time-division manner, and the maximum value MAX2 of the sensing signal CS may be greater than the maximum value MAX1 of the drive signal DS, without being limited thereto. In another embodiment, the drive signal DS and the sensing signal CS may be provided in the state of being synchronized or overlapping in time. For example, the description regarding the sensing signal and the drive signal in FIG. 10C may also be applied to an embodiment in which an AC signal is applied to the first and second coils 120-1 and 120-2.

Figure 13A:
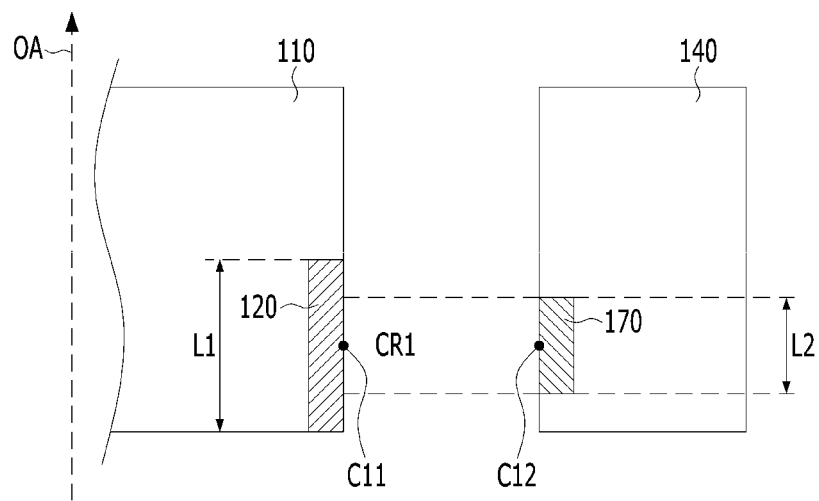
FIGS. 13A to 13C illustrate embodiments of the positional relationship between the coil and the position sensor at the initial position of the bobbin.
Figure 13B:
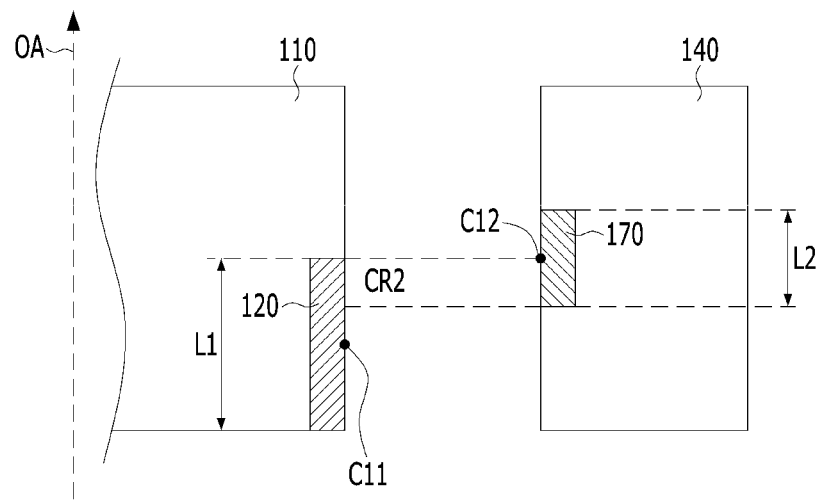
Figure 13C:
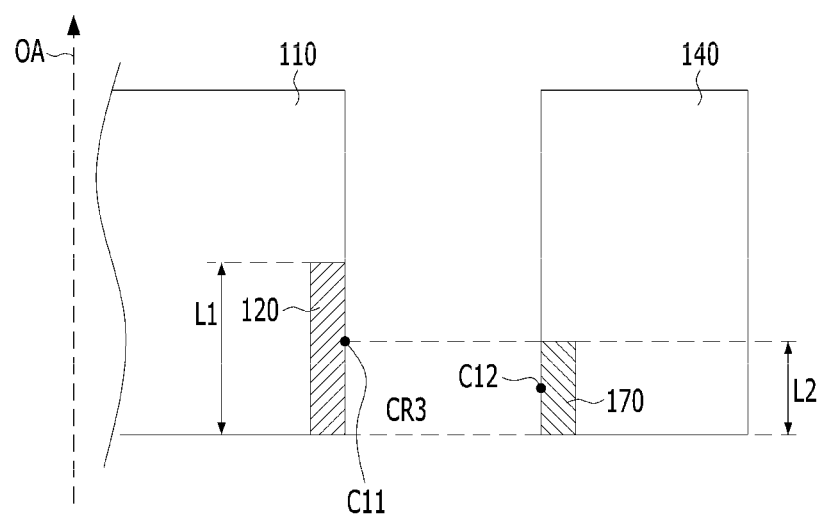

FIGS. 13A to 13C illustrate embodiments of the positional relationship between the coil 120 and the position sensor 170 at the initial position of the bobbin 110.

In FIGS. 13A to 13c, although the sensing zone of the position sensor 170 for detecting a magnetic field may be positioned at the center C12 of the position sensor 170, the disclosure is not limited thereto. In another embodiment, the sensing zone of the position sensor 170 may also be positioned above or under the center of the position sensor 170. The sensing zone of the position sensor 170 may be equally applied to FIGS. 13D to 13F, which will be described later.

In FIGS. 13A to 13C, the length L1 of the coil 120 in the optical-axis direction may be greater than the length L2 of the position sensor 170 in the optical-axis direction (L1>L2). At the initial position of the bobbin 110, the coil 120 and the position sensor 170 may overlap each other at at least a portion thereof.

Referring to FIG. 13A, at the initial position of the bobbin 110, the upper portion or the upper end of the position sensor 170 may be positioned lower than the upper portion or the upper end of the coil 120, and the lower portion or the lower end of the position sensor 170 may be positioned higher than the lower portion or the lower end of the coil 120.

For example, the center C12 of the position sensor 170 may overlap or be aligned with the center C11 of the coil 120 in a direction toward the optical axis OA from the position sensor 170, without being limited thereto. In another embodiment, the center C12 of the position sensor 170 may be positioned higher or lower than the center C11 of the coil 120.

For example, the length L2 of the position sensor 170 in the optical-axis direction may be equal to the length of the coil region CR1 in the optical-axis direction.

Referring to FIG. 13B, at the initial position of the bobbin 110, the center C12 of the position sensor 170 may be positioned higher than the center C11 of the coil 120.

For example, the upper portion or the upper end of the position sensor 170 may be positioned higher than the upper portion or the upper end of the coil region CR2.

Referring to FIG. 13C, at the initial position of the bobbin 110, the center C12 of the position sensor 170 may be positioned lower than the center C11 of the coil 120.

For example, the lower portion or the lower end of the position sensor 170 may be positioned lower than the lower portion or the lower end of the coil region CR3 or may be positioned in the same plane as the lower portion or the lower end of the coil region CR3.

Figure 13D:
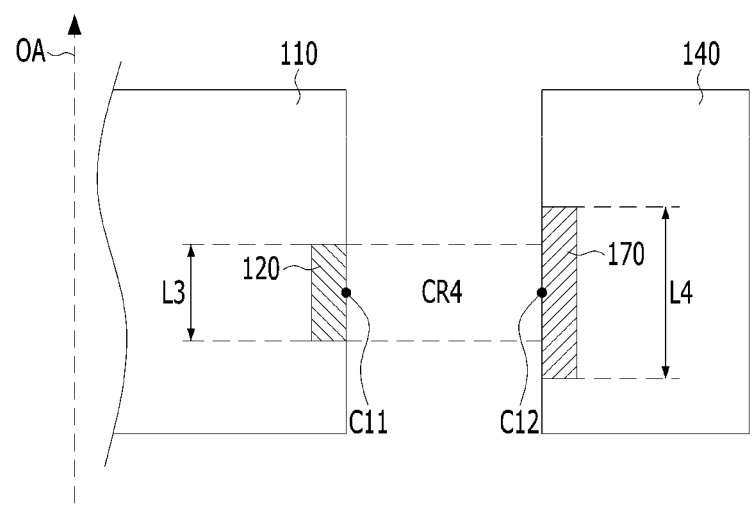
FIGS. 13D to 13F illustrate other embodiments of the positional relationship between the coil and the position sensor at the initial position of the bobbin.
Figure 13E:
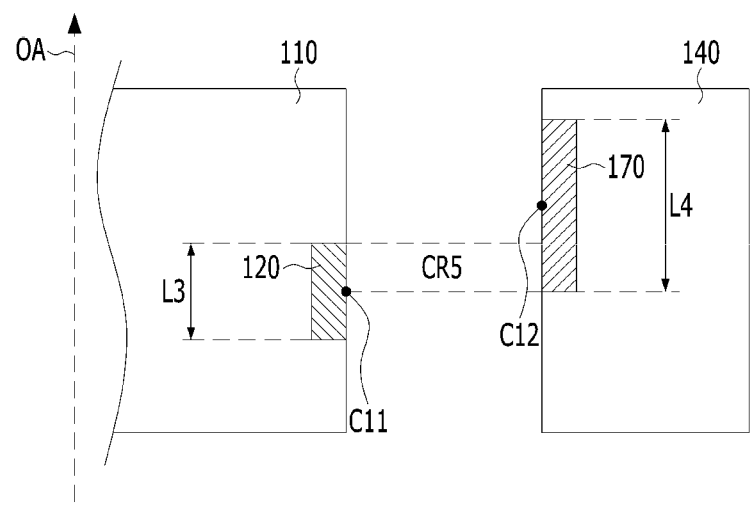
Figure 13F:
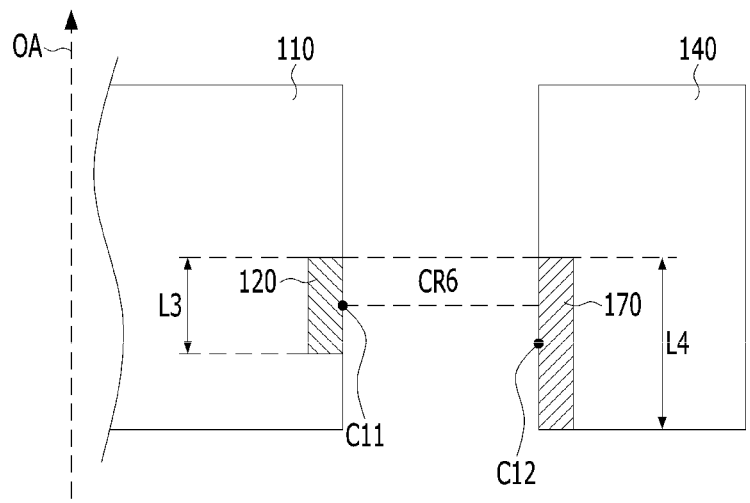

FIGS. 13D to 13F illustrate other embodiments of the positional relationship between the coil 120 and the position sensor 170 at the initial position of the bobbin 110.

In FIGS. 13D to 13F, the length L3 of the coil 120 in the optical-axis direction may be less than the length L4 of the position sensor 170 in the optical-axis direction (L4>L3). At the initial position of the bobbin 110, the coil 120 and the position sensor 170 may overlap each other at at least a portion thereof.

Referring to FIG. 13D, at the initial position of the bobbin 110, the upper portion or the upper end of the coil 120 may be positioned lower than the upper portion or the upper end of the position sensor 170, and the lower portion or the lower end of the coil 120 may be positioned higher than the lower portion or the lower end of the position sensor 170.

For example, the center C12 of the position sensor 170 may overlap or be aligned with the center C11 of the coil 120 in a direction toward the optical axis OA from the position sensor 170, without being limited thereto. In another embodiment, the center C12 of the position sensor 170 may be positioned higher or lower than the center C11 of the coil 120.

For example, the length L3 of the coil 120 in the optical-axis direction may be equal to the length of the coil region CR4 in the optical-axis direction.

Referring to FIG. 13E, at the initial position of the bobbin 110, the coil region CR5 may be positioned closer to the lower portion or the lower end of the position sensor 170.

The center C12 of the position sensor 170 may be positioned higher than the center C11 of the coil 120.

For example, the center C12 of the position sensor 170 may be positioned above the upper portion or the upper end of the coil 120.

Referring to FIG. 13F, at the initial position of the bobbin 110, the coil region CR6 may be positioned closer to the upper portion or the upper end of the position sensor 170. The center C12 of the position sensor 170 may be positioned lower than the center C11 of the coil 120.

For example, the center C12 of the position sensor 170 may be positioned lower than the lower portion or the lower end of the coil 120.

Each of the coil regions CR1 to CR6 may be a partial region of the coil 120 that overlaps the position sensor 170 in a direction toward the optical axis OA from the position sensor 170.

A magnet, for example, a drive magnet or a sensing magnet, may not be disposed between the position sensor 170 and each of the coil regions CR1 to CR6.

In FIG. 11, for example, the initial position of the bobbin 110 may be a position at which the displacement of the bobbin is zero, and the displacement or stroke of the bobbin 110 in a (+) direction, for example, in a forward or upward direction, may be greater than the displacement or stroke of the bobbin 110 in a (−) direction, for example, in a rearward or downward direction.

For example, as the distance between the coil 120 and the position sensor 170 (or the sensing region of the position sensor 170) in a direction toward the optical axis OA decreases, the intensity of the magnetic field of the coil 120, which is detected by the position sensor 170, may increase, and thus the output of the position sensor 170 may increase.

For example, when the center C11 of the coil 120 overlaps the center 12 of the position sensor 170 (or the sensing region of the position sensor 170) in a direction toward the optical axis OA from the position sensor 170, the output of the position sensor 170 may be maximized, without being limited thereto.

In FIGS. 13A and 13D, at the initial position of the bobbin 110, the output of the position sensor 170 may be maximized. As the bobbin 110 is moved, the output of the position sensor 170 may be decreased.

In FIGS. 13B and 13E, as the bobbin 110 is moved in an upward direction or in a direction of (+) displacement from the initial position thereof, the output of the position sensor 170 may be gradually increased. On the other hand, as the bobbin 110 is moved in a downward direction or in a direction of (−) displacement from the initial position thereof, the output of the position sensor 170 may be gradually decreased.

In FIGS. 13C and 13F, as the bobbin 110 is moved in an upward direction or in a direction of (+) displacement from the initial position thereof, the output of the position sensor 170 may be gradually decreased. On the other hand, as the bobbin 110 is moved in a downward direction or in a direction of (−) displacement from the initial position thereof, the output of the position sensor 170 may be gradually decreased.

When the lens moving apparatus has the displacement or stroke of the bobbin 110 as illustrated in FIG. 11, the embodiment shown in FIGS. 13B and 13E may be applied, thereby increasing the linear zone of the output of the position sensor 170.

In the cases shown in FIGS. 13A, 13C, 13D and 13F, graphs representing the output of the position sensor according to displacement of the bobbin, which are different from that shown FIG. 11, may be provided. In each of the graphs, the output of the position sensor 170 may have a linear zone, and displacement of the bobbin 110 may be detected using the linear zone in the output of the position sensor 170.

In order to increase the linear zone in FIGS. 13B and 13E, the maximum stroke of the bobbin 110 in a direction of (+) displacement (for example, the maximum displacement or stroke in a direction of (+) displacement) may be smaller than the distance between the center C11 of the coil 120 and the upper portion or the upper end of the coil 120.

In order to increase the linear zone in FIGS. 13B and 13E, the maximum stroke of the bobbin 110 in a direction of (+) displacement may be smaller than the distance between the center C11 of the coil 120 and the center C12 of the position sensor 170.

In contrast, when the displacement or stroke of the bobbin 110 in a direction of (−) displacement, for example, in a rearward direction or in a downward direction, is larger than the displacement or stroke of the bobbin 110 in a direction of (+) displacement, for example, in a forward direction or in an upward direction, the embodiments shown in FIGS. 13C and 13F may be applied, and thus the linear zone in the output of the position sensor 170 may be increased.

In order to increase the linear zone in FIGS. 13C and 13F, the maximum stroke of the bobbin 110 in a direction of (−) displacement (for example, the maximum displacement or stroke in a direction of (+) displacement) may be smaller than the distance between the center C11 of the coil 120 and the lower portion or the lower end of the coil 120.

In order to increase the linear zone in FIGS. 13C and 13F, the maximum stroke of the bobbin 110 in a direction of (−) displacement may be smaller than the distance between the center C11 of the coil 120 and the center C12 of the position sensor 170.

Figure 14:
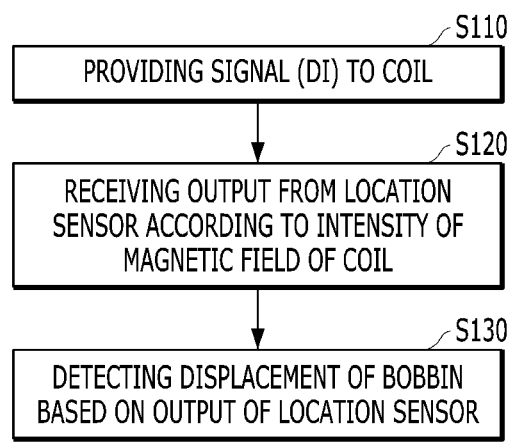
FIG. 14 is a flowchart illustrating a process of detecting displacement of the bobbin using the lens moving apparatus according to the embodiment.

FIG. 14 is a flowchart illustrating a process of detecting the displacement of the bobbin using the lens moving apparatus according to the embodiment.

Referring to FIG. 14, by means of the controller 820 of the camera module 200 or the controller 780 of the terminal 200A, the signal DI may be provided to the coil 120 (S110). For example, the signal DI may be identical to that described in FIGS. 9 to 12B.

In response to the signal DI, the output of the position sensor 170 according to the intensity of the magnetic field generated by the coil 120 (or 120-1 and 120-2) may be received (S120).

For example, the output of the position sensor 170 may be received by the controller 830 of the camera module 200 or the controller 780 of the terminal 200A.

Here, the output received from the position sensor 170 may be proportional to the intensity of the magnetic field generated by the coil 120 (120-1 and 120-2), which varies with the movement of the bobbin 110.

Subsequently, by means of the controller 830 of the camera module 200 or the controller 780 of the terminal 200A, the displacement of the bobbin may be detected based on the output (for example, the output voltage) received from the position sensor 170 (S130).

For example, the controller 830 of the camera module 200 or the controller 780 of the terminal 200A may detect displacement of the bobbin 110 by detecting displacement of the bobbin 110 corresponding to the output (H_out) received from the position sensor 170 in the graph shown in FIG. 11.

For example, the information about the displacement of the bobbin 110 corresponding to the output (H_out) received from the position sensor 170 in the graph shown in FIG. 11 may be stored in the controller 830 of the camera module 200 or the controller 780 of the terminal 200A in the form of a lookup table, a formula, an algorithm or a program.

Because the output (for example, the voltage) received from the position sensor 170 is low, the camera module 200 or the terminal 200A according to the embodiment may include an amplifier for amplifying the output of the position sensor 170 in order to improve the sensing sensitivity for displacement of the bobbin. Here, the amplifier may be embodied as being included in the controller 830 of the camera module 200 or the controller 780 of the terminal 200A, without being limited thereto. In another embodiment, the amplifier may be provided separately from the controller 830 or 700.

An operation of amplifying the output of the position sensor 170 and outputting a signal corresponding to the result of the amplification may further be included between operations S120 and S130 in FIG. 14.

Although the magnets 130-1 to 130-4 and the position sensor 170 are disposed at the housing 140 and the coil 120 (120-1 and 120-2) is disposed at the bobbin 110 in the embodiment shown in FIGS. 1 to 8, the disclosure is not limited thereto.

In another embodiment, the magnets may be disposed at the bobbin 110, and the coil and the position sensor may be disposed at the housing 140. In this case, the description disclosed in FIG. 9 to 140 may be applied.

Since a magnet for sensing the position sensor 170 is not additionally provided, the embodiment is capable of reducing the number of components and in turn manufacturing costs. Accordingly, the lens moving apparatus 100 according to the embodiment eliminates the necessity to dispose or mount a magnet corresponding to the position sensor to the bobbin.

Furthermore, since the sensing magnet is omitted, it is possible to prevent magnetic-field interference between the drive magnet and the sensing magnet, and the embodiment is thus capable of improving the accuracy and reliability of AF operation.

In addition, it is possible to increase the size of the magnets 130-1 to 130-4 by disposing the position sensor 170 at the corner portion 142-1 of the housing 140. Consequently, it is possible to increase electromagnetic force and to reduce power consumption.

Since the electromagnetic force is increased, it is possible to increase the modulus of elasticity of the upper elastic member and the lower elastic member, and it is possible to suppress performance variation attributable to changes in the orientation of the AF operation unit.

Figure 15:
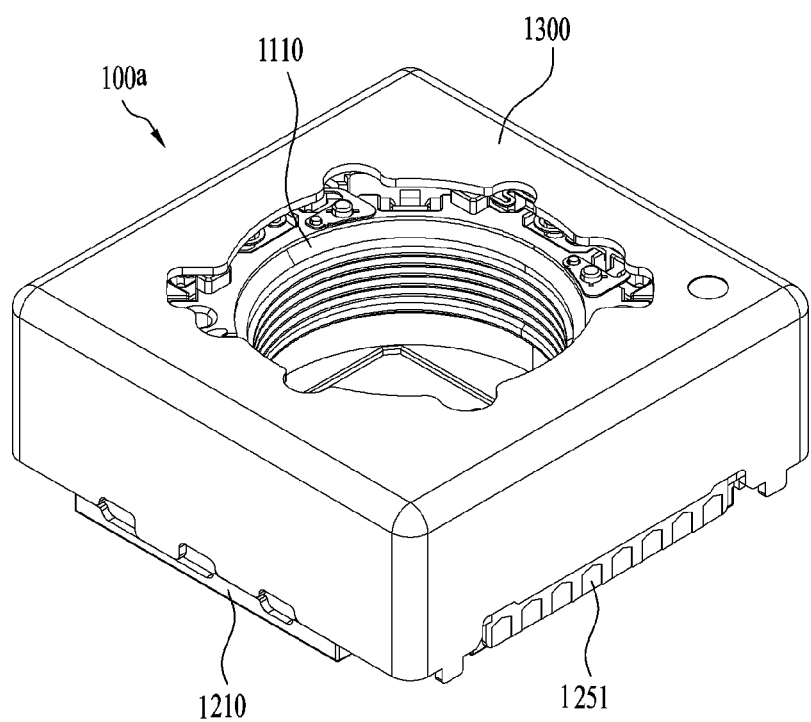
FIG. 15 is a perspective view of a lens moving apparatus according to another embodiment.
Figure 16:
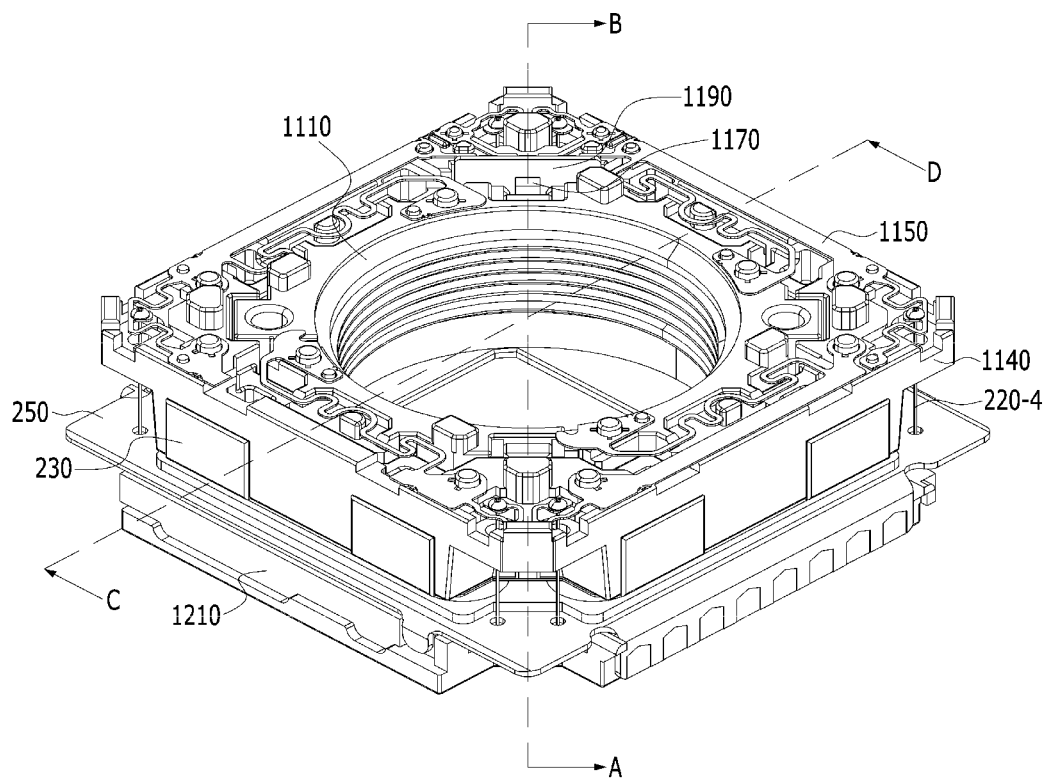
FIG. 16 is a perspective of FIG. 15, from which a cover member is removed.
Figure 17A:
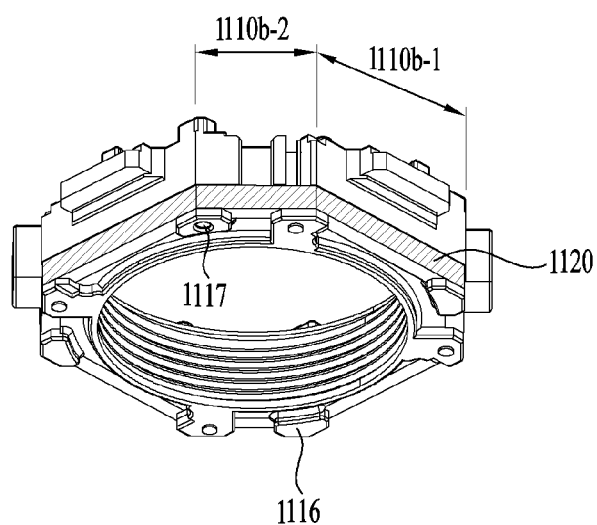
FIG. 17A is an assembled perspective view of the bobbin and the first coil shown in FIG. 16.
Figure 17B:
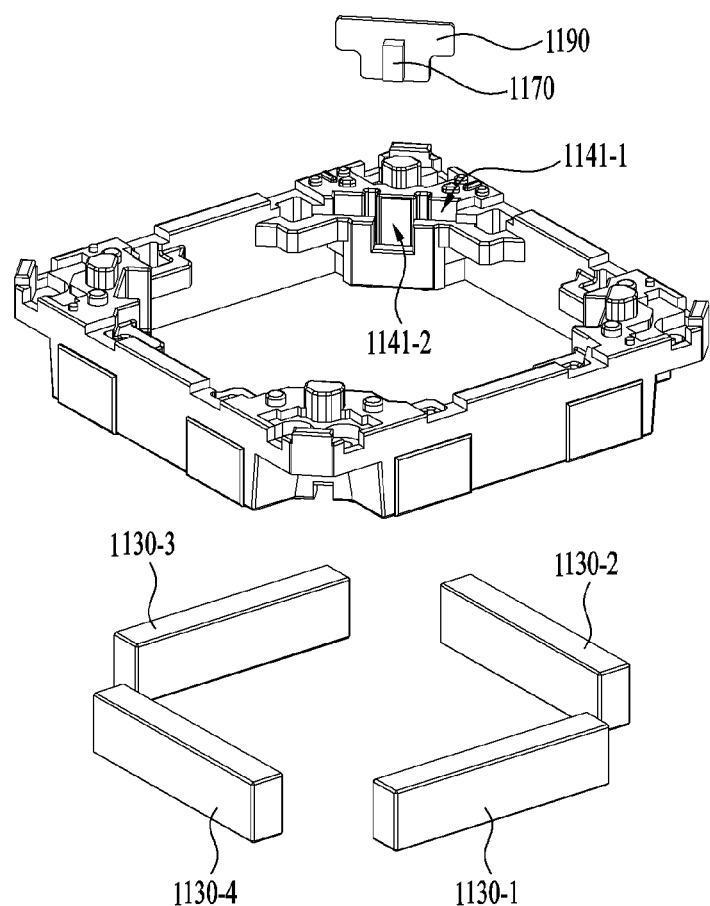
FIG. 17B is an exploded perspective view of a housing, magnets, a first position sensor and a first circuit board, which are shown FIG. 16.
Figure 18:
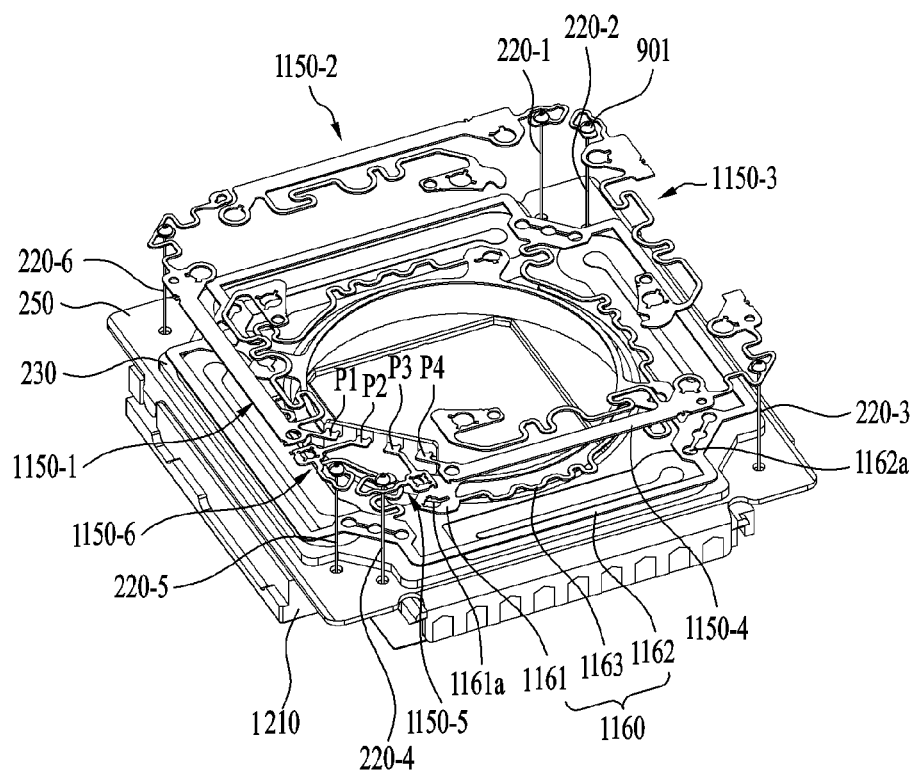
FIG. 18 is a perspective view of an upper elastic member, a lower elastic member, a second coil, a second circuit board and a base, which are shown in FIG. 16.
Figure 19:
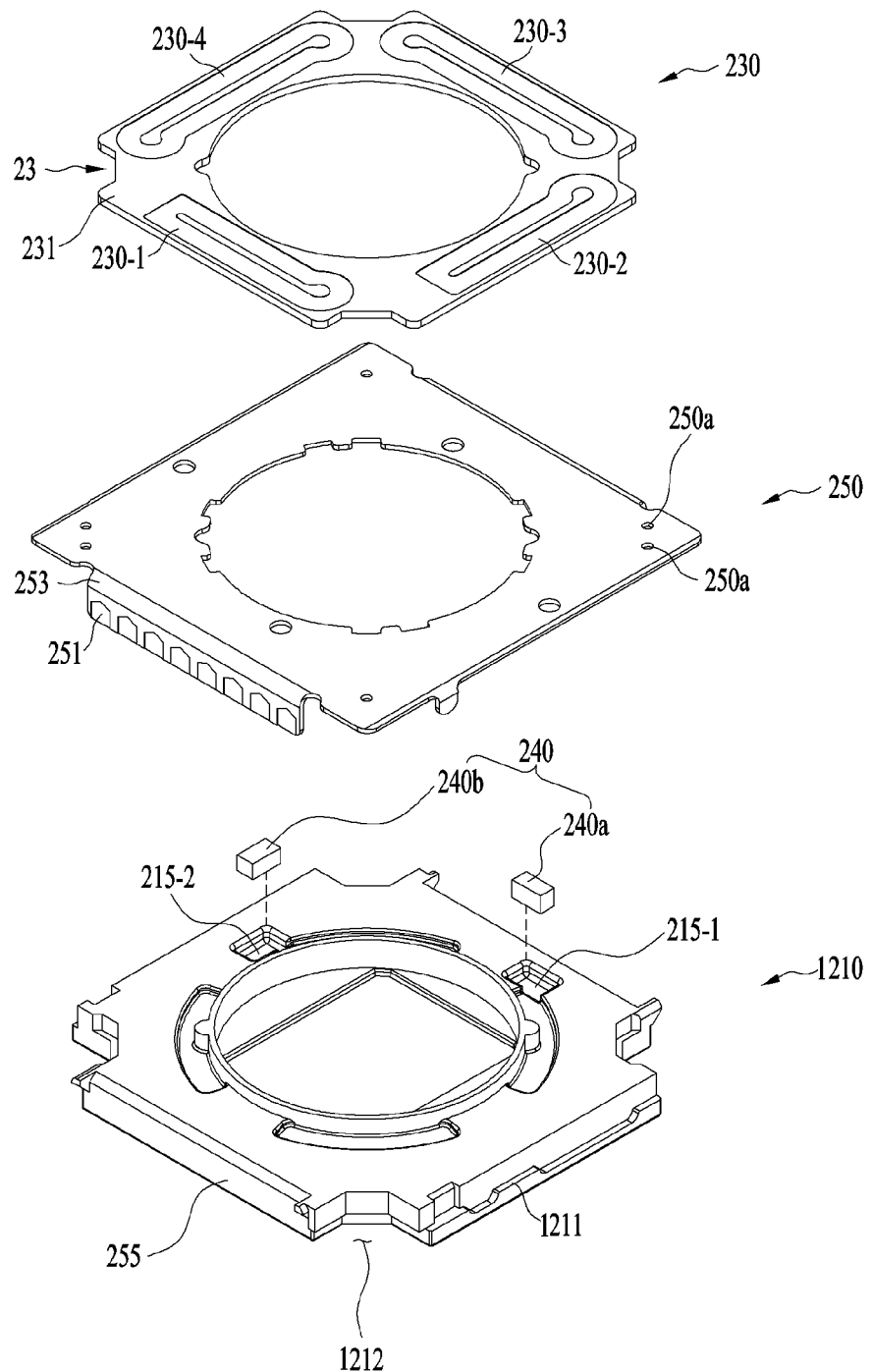
FIG. 19 is a perspective view of the second coil, the second circuit board, the base and the second position sensor, which are shown in FIG. 16.
Figure 20:
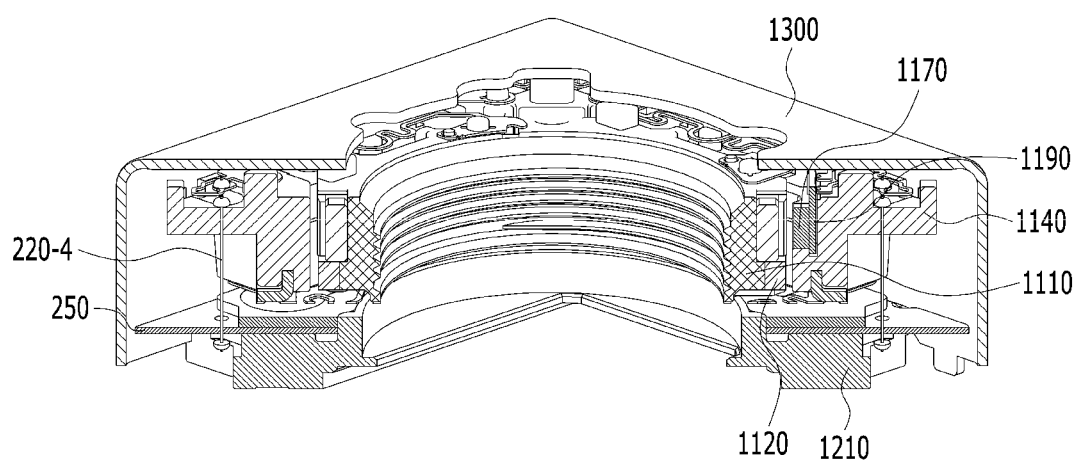
FIG. 20 is a cross-sectional view of FIG. 16, taken along line A-B.
Figure 21:
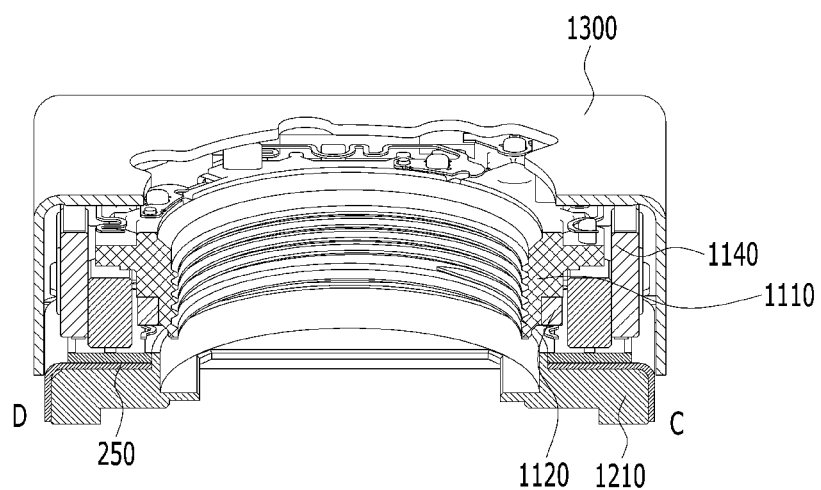
FIG. 21 is a cross-sectional view of FIG. 16, taken along line C-D.

FIG. 15 is a perspective view of a lens moving apparatus 100a according to another embodiment. FIG. 16 is a perspective view of FIG. 15, from which a cover member 1300 is removed. FIG. 17A is an assembled perspective view of a bobbin 1110 and a first coil 1120. FIG. 17B is an exploded perspective view of a housing 1140, magnets 1130-1 to 1130-4, a first position sensor 1170 and a first circuit board 1190, which are shown in FIG. 16. FIG. 18 is a perspective view of an upper elastic member 150, a lower elastic member 160, a second coil 230, a second circuit board 250 and a base 1210, which are shown in FIG. 16. FIG. 19 is a perspective view of the second coil 230, the second circuit board 250, the base 1210 and the second position sensor 240, which are shown in FIG. 16. FIG. 20 is a cross-sectional view of FIG. 16, taken along line A-B. FIG. 21 is a cross-sectional view of FIG. 16, taken along line C-D. The cover member 1330 is also shown in FIGS. 20 and 21.

Referring to FIGS. 15 to 19, the lens moving apparatus 100a may include the bobbin 1110, the first coil 1120, the magnets 1130-1 to 1130-4, the housing 1140, the upper elastic member 1150, the lower elastic member 1160 and the first position sensor 1170.

The first coil 1120 may be an AF coil for AF operation, and the second coil 230 may be an OIS coil for OIS operation.

The lens moving apparatus 100a may further include the first circuit board 1190 conductively connected to the first position sensor 1170.

The lens moving apparatus 100a may further include a support 220, the second circuit board 250 and the base 1210.

The lens moving apparatus 100a may further include the second coil 230 for OIS (optical image stabilization) operation and the second position sensor 240 for OIS feedback operation. The lens moving apparatus 100a may further include the cover member 300.

The description regarding the cover member shown in FIG. 1 may be incorporated into or applied to the cover member 1300 of the lens moving apparatus 100a.

The description regarding the bobbin 110 shown in FIGS. 3A and 3B may be incorporated into or applied to the bobbin 1110 of the lens moving apparatus 100a. For example, the description regarding the first side portions 110b-1 and the second side portions 110b-2 of the bobbin 110 may be incorporated into or applied to the first side portions 1110b-1 and the second side portions 1110b-2 of the bobbin 1110 of the lens moving apparatus 100a.

The bobbin 1110 may include a first lower coupling groove 1117 formed in the lower surface thereof, which is coupled or secured to a hole 1161a in the lower elastic member 1160. In another embodiment, the bobbin 1110 may be provided on the lower surface thereof with a support protrusion, which is secured in the hole 1161a in the lower elastic member 1160.

The bobbin 1110 may include a stopper 1116 projecting from the lower surface thereof, and the description regarding the second stopper 116 shown in FIG. 3B may be incorporated into or applied to the stopper 1116.

The description regarding the coil 120 shown in FIGS. 3A and 3B may be incorporated into or applied to the first coil 1120 of the lens moving apparatus 100a. For example, a drive signal and a sensing signal may be provided to the first coil 1120.

The description regarding the housing 140 and the magnets 130-1 to 130-4 shown in FIGS. 4A and 4B may be incorporated into or applied to the housing 1140 and the magnets 1130-1 to 1130-4 of the lens moving apparatus 100a.

For example, the housing 1140 may have a first groove 1141-1 for receiving therein the first circuit board 1190 and a second groove 1141-2 for receiving therein the first position sensor 1170.

For example, the first groove 1141-1 may be formed in the upper portion or the upper end of one of the corner portions of the housing 1140. In order to allow the first circuit board 1190 to be easily mounted, the first groove 1141-1 may have the form of a groove, which is open at the upper surface and has a side surface and a bottom. The side surface of the first groove 1141-1 may have a shape that corresponds to or coincides with the shape of the first circuit board 1190.

For example, the second groove 1141-2 may be formed in the inner surface of one of the corner portions of the housing 1140. The second groove 1141-2 may be open in an inward direction of the housing 1140 and may abut the first groove 1141-1, without being limited thereto.

For example, in order to allow the first position sensor 1170 to be easily mounted, the second groove 1141-2 may be configured so as to be open at the upper surface and the side surface. The second groove 1141-2 may have a shape that corresponds to or coincides with the shape of the first position sensor 1170.

The first position sensor 1170 and the circuit board 1190 may be disposed at one of the corner portions of the housing 1140. The first position sensor 1170 may be disposed or mounted to the circuit board 1190. The first position sensors 1170 may be embodied as a driver including a hall sensor, or may be embodied as a position detection sensor, such as a hall sensor, alone. The first circuit board 1190 may include pads conductively connected to the first position sensor 1170.

The description regarding the position sensor 170 shown in FIG. 5 may be incorporated into or applied to the position sensor 1170.

The upper elastic member 1150 and the lower elastic member 1160 may be coupled both to the bobbin 1110 and to the housing 1140 to support the bobbin 1110.

The support 220 may support the housing 1140 with respect to the base 1210, and may conductively connect at least one of the upper elastic member 1150 or the lower elastic member 1160 to the second circuit board 250.

At least one of the upper elastic member 1150 and the lower elastic member 1160 may include a plurality of springs.

For example, the upper elastic member 1150 may include first to sixth upper springs 1150-1 to 1150-6, which are spaced apart from or separated from one another.

Each of the first to fourth upper springs 1150-1 to 1150-4 may include a first inner frame 1151 coupled to the upper portion, the upper surface or the upper end of the bobbin 110, a first outer frame 1152 coupled to the upper portion, the upper surface or the upper end of the housing 1152, and a first frame connector 1153 connecting the first inner frame 1151 to the first outer frame 1152.

Each of the fifth and sixth springs 1150-5 and 1150-6 may include a first outer frame 1152 coupled to the upper portion, the upper surface or the upper end of the housing 1140.

Although the fifth and sixth upper springs shown in FIG. 18 do not include the first inner frame or the first frame connector, the disclosure is not limited thereto. In another embodiment, the fifth and sixth upper springs may include the first inner frame and the first frame connector.

The first outer frame 1152 of each of the first to sixth upper springs 1150-1 to 1150-6 may include a first coupler coupled to one of the supports 220-1 to 220-6, a second coupler coupled to at least one of the corner portions and the side portions adjacent to the corner portions of the housing 1140, and a connector connecting the first coupler to the second coupler 2.

Although each of the second couplers of the first to sixth upper springs 1150-1 to 1150-6 may be embodied so as to include a coupling region (for example, a hole) to be coupled to the housing 1140 in the embodiment shown in FIG. 18, the disclosure is not limited thereto. In another embodiment, the coupling region may be embodied as various shapes capable of being coupled to the housing 140, for example, a groove or the like.

The first coupler may have a hole through which one of the supports 220-1 to 220-6 extends. One end of one of the supports 220-1 to 220-6, which has passed through the hole in the first coupler, may be coupled to the first coupler using a conductive adhesive member or solder 910. The first coupler and a corresponding one of the supports 220-1 to 220-6 may be conductively connected to each other.

The connector may connect the coupling region of the second coupler, disposed at the corner portion of the housing 1140, to the first coupler, and may include a bent portion, which is bent at least once, or a curved portion, which is curved at least once, without being limited thereto. In another embodiment, the connector may have a linear shape.

The first outer frame 1152 of each of the first and fourth to sixth upper springs 1150-1 and 1150-4 to 1150-6 may include a corresponding one of contacts P1 to P4, which is brought into contact with or connected to a corresponding one of the pads of the first circuit board 1190.

For example, each of the first and fourth to sixth upper springs 1150-1 and 1150-4 to 1150-6 may include a corresponding one of the contacts P1 to P4 extending from the second coupler.

Each of the contacts P1 to P4 may be in direct contact with a corresponding one of the pads of the first circuit board 1190, and each of the contacts P1 to P4 may be conductively connected to a corresponding one of the pads of the first circuit board 1190 using solder or the like.

The lower elastic member 1160 may include a second inner frame 1161 coupled to the lower portion, the lower surface or the lower end of the bobbin 1110, a second outer frame 1162 coupled to the lower portion, the lower surface or the lower end of the housing 1140, and a second frame connector 1163 connecting the second inner frame 1161 to the second outer frame 1162.

The lower elastic member 1160 may have therein a hole 1161a, which is formed in the second inner frame 1161 and is coupled to the first lower coupling groove 1117 in the bobbin 1110 using solder or a conductive adhesive member, and a hole 1162a, which is formed in the second outer frame 1162 and may be coupled to the protrusion provided on the lower surface of the housing 1140.

By means of solder or a conductive adhesive member, the support 220 may be coupled at one end thereof to the upper elastic member 1150 and at the other end thereof to the circuit board 1250, the circuit member 231 or the base 1210.

The support 220 may include a plurality of supports. Each of the plurality of supports 220-1 to 220-6 may be coupled to the first coupler of a corresponding one of the upper springs 1150-1 to 1150-6 using the solder 901, and may be conductively connected thereto. For example, the plurality of supports 220-1 may be disposed at the corner portions of the housing 1140.

The plurality of supports 220-1 to 220-6 may support the bobbin 1110 and the housing 1140 such that the bobbin 1110 and the housing 1140 are movable in a direction perpendicular to the first direction. Although one or two supports are disposed at each of the corner portions of the housing 1140 in FIG. 18, the number of supports disposed at each of the corner portions is not limited thereto.

In another embodiment, two or more supports may be disposed at each of the corner portions of the housing 1140, or one support may be disposed at each of the corner portions of the housing 1140.

Each of the plurality of supports 220-1 to 220-6 may be spaced apart from the housing 1140, and may be directly connected to the first coupler of the first outer frame 1152 of each of the upper springs 1150-1 to 1150-6, rather than being secured to the housing 1140.

In another embodiment, the support 220 may be embodied as a leaf spring, and may be disposed at the side portion of the housing 1140.

The drive signal DS and the sensing signal CS may be transmitted to the first coil 1120 from the second circuit board 250 via the plurality of supports 220-1 to 220-6 and the upper springs 1150-1 to 1150-6. The drive signal may be provided to the first position sensor 1170 from the second circuit board 250, and the output signal from the first position sensor 1170 may be transmitted to the second circuit board 250.

For example, the drive signal DS and the sensing signal CS may be provided to the first coil 1120 from the second circuit board 250 via the second and third upper springs 1150-2 and 1150-3 and the first and second supports 220-1 and 220-2.

For example, the drive signal may be provided to the first position sensor 1170 from the second circuit board 250 via the fourth and fifth upper springs 1150-4 and 1150-5 and the third and fourth supports 220-4 and 220-5, and the output signal from the first position sensor 1170 may be transmitted to the second circuit board 250 via the first and sixth upper springs 1150-1 and 1150-6 and the fifth and sixth supports 220-5 and 220-6.

Because the drive signal DS and the sensing signal CS have to be independently provided to the two coils 120-1 and 120-2, respectively, when the modification shown in FIG. 12A is applied to the lens moving apparatus 100*a*, the upper elastic member may include eight upper springs, and the support may include eight supports corresponding to the eight upper springs.

The drive signal may be provided to the coil 120-1 via two upper springs and two supports, and the sensing signal may be provided to the coil 120-1 via two other upper springs and two other supports. The drive signal may be provided to the first position sensor 1170 and the output signal may be received via the four remaining upper springs and the four remaining supports.

Each of the plurality of supports may be made of a member separate from the upper elastic member 1150, and may be embodied as a member capable of elastically supporting an object, for example, a leaf spring, a coil spring, a suspension wire or the like. In another embodiment, the supports 220-1 to 220-6 may be integrally formed with the upper elastic member 1150.

Next, the base 1210, the second circuit board 250, the second coil 230 and the second position sensor 240 will be described.

The base 1210 may have an opening corresponding to the opening in the bobbin 1110 and/or the opening in the housing 1140, and may have a shape that coincides with or corresponds to that of the cover member 1300, for example, a square shape.

Referring to FIG. 19, the base 1210 may include a step 1211, to which an adhesive is applied when the base 1210 is adhesively secured to the cover member 1300. Here, the step 1211 may guide the cover member 1300 coupled to the upper side thereof, and may face the lower end of the side plate of the cover member 1300.

The base 1210 may be disposed under the bobbin 1110 and the housing 1140, and may include a support groove or a support portion 255, which is formed on the surface thereof that faces the portion including the terminals 251 of the circuit board 250. The support groove 255 of the base 1210 may support the terminal member 253 of the second circuit board 250.

The base 1210 may have depressed grooves 1212. When each of the corners of the cover member 1300 has a projecting shape, the projections of the cover member 1300 may be fastened to the base 1210 through the depressed grooves 1212.

The base 210 may be provided in the upper surface thereof with mounting grooves 215-1 and 215-2, in which the second position sensors 240 mounted on the second circuit board 250 are disposed or mounted. According to the embodiment, the base 1210 may be provided with two mounting grooves 1215-1 and 1215-2.

The second coil 230 may be disposed above the second circuit board 250, and the second position sensor 240 may be disposed under the circuit board 250.

For example, the second position sensor 240 may be mounted on the lower surface of the second circuit board 250, and the lower surface of the second circuit board 250 may face the upper surface of the base 1210.

The second circuit board 250 may be positioned under the housing 1140, may be disposed on the upper surface of the base 1210, and may have an opening that corresponds to the opening in the bobbin 110 and/or the opening in the base 1210. The outer peripheral surface of the second circuit board 250 may have a shape that coincides with or corresponds to the upper surface of the base 210, for example, a square shape.

The second circuit board 250 may include at least one terminal portion, which is bent from the upper surface of the circuit board 250 and which includes a plurality of terminals 251 or pins for conductive connection to external components.

The terminal portion 253 of the second circuit board 250 may include the plurality of terminals 251. For example, a drive signal and a sensing signal, which are received through the plurality of terminals 251 provided at the terminal portion 253 of the second circuit board 250, may be provided to the first coil 1120. The second circuit board 250 may provide the second coil 230 with the drive signal, which is received through the plurality of terminals 251.

Furthermore, the second circuit board 250 may provide the first and second position sensors 1170 and 240 with the drive signal, which is received through the plurality of terminals 251, and may output the output signals, which are output from the first and second sensors 1170 and 240, to the outside.

According to the embodiment, the circuit board 250 may be an FPCB, without being limited thereto. The terminals of the second circuit board 250 may also be directly formed on the surface of the base 1210 through a surface electrode formation technology.

The circuit board 250 may have therein holes 250*a*, through which the supports 220-1 to 220-4 extend. The positions and number of holes 250*a* may correspond to or coincide with the positions and number of supports 220-1 to 220-6.

Each of the supports 220-1 to 220-6 may be disposed so as to be spaced apart from the inner surface of a corresponding one of the holes 250*a* in the circuit board 250.

Although the supports 220-1 to 220-6 may extend through the holes 250*a* in the circuit board 250 and may be conductively connected to the circuit pattern disposed on the lower surface of the circuit board 250 through soldering, the disclosure is not limited thereto.

In another embodiment, the supports 220-1 to 220-6 may be coupled to the lower surface of the circuit member 231, and the circuit member 231 and the circuit board 250 may be conductively connected to each other. Consequently, the supports 220-1 to 220-6 and the circuit board 250 may be conductively connected to each other.

In a further embodiment, the supports 220-1 to 220-6 may be coupled to the base 1210, for example, the upper surface or the lower surface of the base 1210, and a circuit pattern or wires for connecting the supports 220-1 to 220-6 and the circuit board 250 to the base 1210 may be provided.

The second coil 230 may be positioned under the housing 1140, and may be disposed at the upper portion of the second circuit board 250 so as to correspond to the magnets 1130-1 to 1130-4 disposed at the housing 1140.

For example, the second coil 230 may include four OIS coils 230-1 to 230-4 disposed at the four sides of the circuit board 250, without being limited thereto. The second coil 230 may also include only two coils, for example, one coil for the second direction and one coil for the third direction, or may include four or more coils.

Although FIG. 19 illustrates the second coil 230 provided at an additional circuit member 231 separate from the second circuit board 250, the disclosure is not limited thereto. In another embodiment, the second coil 230 may be embodied as a circuit pattern formed at the second circuit board 250.

In a further embodiment, the second coil 230 may be embodied as a ring-shaped coil block or an FP coil separate from the circuit member 231 and the circuit board 250.

The circuit member 231, at which the second coil 230 is provided, may have escape grooves 23 formed in the corners thereof. The escape grooves 23 may have shapes such that the corners of the circuit member 231 are chamfered. In another embodiment, the corner portions of the circuit member 231 may have holes through which the supports 220 extend.

As described above, the housing 1140 may be moved in the second direction and/or the third direction by the interaction between the first magnets 1130 and the second coil 230, which correspond to each other, thereby performing handshake correction.

The second position sensor 240 may detect the intensity of the magnetic field of the magnets 130-1 to 130-4 disposed on the housing 1140 when the housing 1140 is moved in a direction perpendicular to the optical-axis direction, and may output an output signal (for example, an output voltage) according to the result of the detection.

Based on the output signal from the second position sensor 240, it is possible to detect displacement of the housing 1140 relative to the base 1210 in a direction (for example, in the X-axis direction or in the Y-axis direction) perpendicular to the optical axis (for example, in the Z-axis direction).

The second position sensor 240 may include two OIS position sensors 240a and 240b for detecting displacement of the housing 1140 in the second direction (for example, in the X-axis direction) and in the third direction (for example, in the Y-axis direction) perpendicular to the optical axis.

The OIS position sensor 240a may detect the intensity of the magnetic field of the magnet 1130-1 to 1130-4 when the housing 1140 is moved, and may output a first output signal according to the result of the detection. The OIS position sensor 240b may detect the intensity of the magnetic field of the magnets 1130-1 to 1130-4 when the housing 140 is moved, and may output a second output signal according to the result of the detection.

The controller 830 of the camera module 200 or the controller 780 of the portable terminal 200A may detect the displacement of the housing 1140 based on the first and second output signals, and may perform OIS feedback operation based on the detected displacement of the housing 1140.

Each of the OIS position sensors 240a and 240b may be embodied as a hall sensor. Any sensor may be used, as long as the sensor is capable of detecting the intensity of a magnetic field. For example, each of the OIS position sensors 240 may be embodied as a driver including a hall sensor, or may be embodied as a position detection sensor, such as a hall sensor, alone.

Each of the OIS position sensors 240a and 240b may be mounted on the second circuit board 250, and the second circuit board 250 may include terminals conductively connected to the OIS position sensors 240a and 240b.

The base 1210 may be provided on the upper surface thereof with a coupling protrusion (not shown) for coupling the second circuit board 250 to the base 1210, and the second circuit board 250 may have formed therein a hole (not shown), in which the coupling protrusion of the base 1210 is secured using heat fusion or an adhesive member such as epoxy.

The description disclosed in FIGS. 12A to 14 may be equally applied to the lens moving apparatus 100a shown in FIGS. 15 to 19.

Meanwhile, the lens moving apparatuses according to the above-described embodiments may be used in various fields, such as, for example, those of a camera module or an optical device.

For example, the lens moving apparatus 100 according to the embodiment may be included in an optical instrument, which is designed to form the image of an object in a space using reflexion, refraction, absorption, interference, diffraction or the like, which is the characteristic of light, to extend eyesight, to record an image obtained through a lens or to reproduce the image, to perform optical measurement, or to propagate or transmit an image. For example, the optical instrument according to the embodiment may include a smart phone and a portable terminal equipped with a camera.

Figure 22:
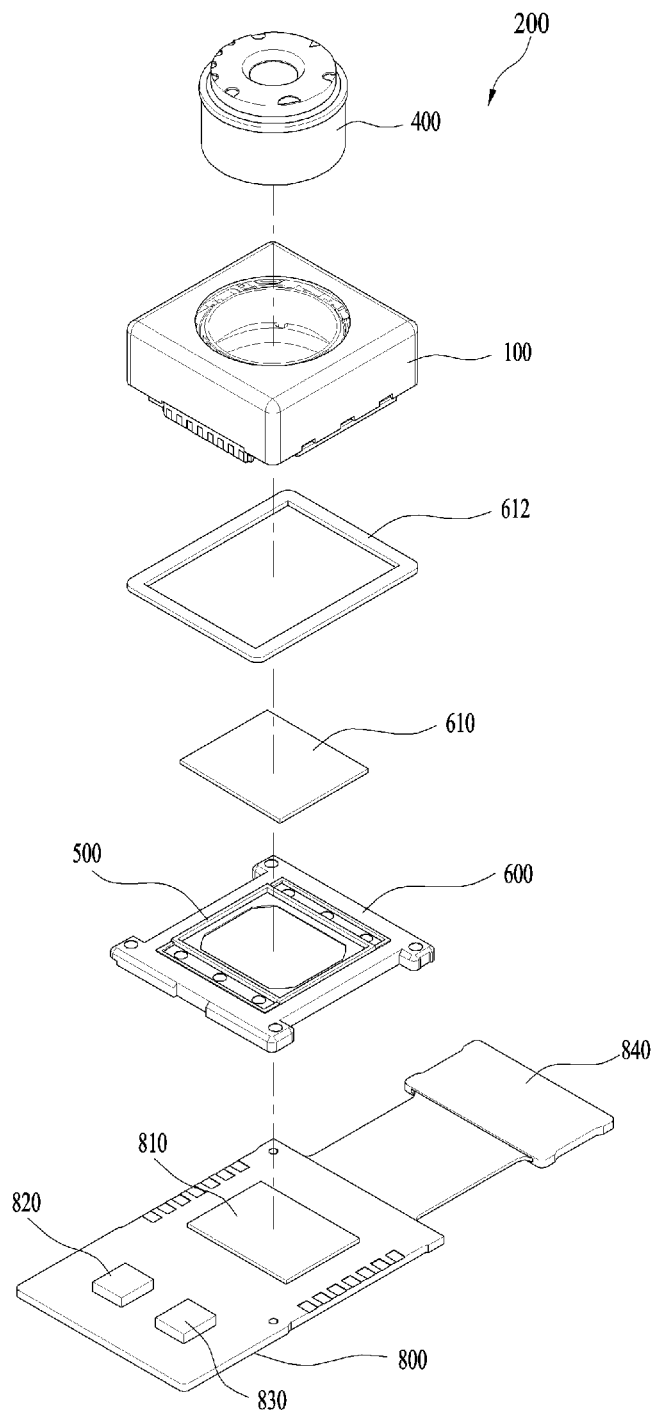
FIG. 22 is an exploded perspective view of a camera module according to an embodiment.

FIG. 22 is an exploded perspective view illustrating a camera module 200 according to an embodiment.

Referring to FIG. 22, the camera module 200 may include a lens or a lens barrel 400, the lens moving apparatus 100, an adhesive member 612, a filter 610, a first holder 600, a second holder 800, an image sensor 810, a motion sensor 820, a controller 830, and a connector 840.

The lens or the lens barrel 400 may be mounted in the bobbin 110 of the lens moving apparatus 100. In another embodiment, the camera module may include the lens moving apparatus 100a shown in FIG. 15 in place of the lens moving apparatus 100.

The first holder 600 may be located under the base 210 of the lens moving apparatus 100. The filter 610 may be mounted on the first holder 600, and the first holder 600 may have a raised portion 500 on which the filter 610 is seated.

The adhesive member 612 may couple or attach the base 210 of the lens moving apparatus 100 to the first holder 600. In addition to the attachment function described above, the adhesive member 612 may serve to prevent contaminants from entering the lens moving apparatus 100.

The adhesive member 612 may be, for example, epoxy, thermohardening adhesive, or ultraviolet hardening adhesive.

The filter 610 may serve to prevent light within a specific frequency band that passes through the lens barrel 400 from being introduced into the image sensor 810. The filter 610 may be, for example, an infrared-light-blocking filter, without being limited thereto. Here, the filter 610 may be oriented parallel to the X-Y plane.

The region of the first holder 600 in which the filter 610 is mounted may be provided with an opening in order to allow the light that passes through the filter 610 to be introduced into the image sensor 810.

The second holder 800 may be disposed under the first holder 600, and the image sensor 810 may be mounted on the second holder 600. The image sensor 810 may be a portion on which an image included in the light that passes through the filter 610 and that is introduced thereinto is formed.

The second holder 800 may include, for example, various circuits, devices, and a controller in order to convert the image, formed on the image sensor 810, into electrical signals and to transmit the electrical signals to an external component.

The second holder 800 may be embodied as a circuit board on which the image sensor 810 may be mounted, on which a circuit pattern may be formed, and to which various devices may be coupled.

The image sensor 810 may receive an image contained in the light introduced through the lens moving apparatus 100, 1100, 2100 and may convert the received image into electrical signals.

The filter 610 and the image sensor 810 may be spaced apart from each other so as to be opposite each other in the first direction.

The motion sensor 820 may be mounted on the second holder 800, and may be conductively connected to the controller 830 through the circuit pattern formed on the second holder 800.

The motion sensor 820 may output rotational angular speed caused by motion. The motion sensor 820 may be embodied as a dual-axis or triple-axis gyro sensor or an angular speed sensor.

The controller 830 may be mounted on the second holder 800. The second holder 800 may be conductively connected to the lens moving apparatus 100. For example, the second holder 800 may be conductively connected to the coil 120, 120-1 and 120-2 and the position sensor 170 of the lens moving apparatus 100.

For example, the controller 830 may output the amplified signal obtained by amplifying the output (for example, the output voltage) of the position sensor 170, may create digital values through analog-to-digital conversion of the amplified signal, and may detect the displacement of the bobbin 110 based on the created digital values and data on displacement of the bobbin stored in a lookup table.

For example, a drive signal and a sensing signal may be supplied to each of the coil 120 and the position sensor 170 through the second holder 800, and the output signal of the position sensor 170 may be transmitted to the second holder 800. For example, the output signal of the position sensor 170 may be transmitted to the controller 830.

The connector 840 may be conductively connected to the second holder 800, and may have a port for the electrical connection of an external component.

Figure 23:
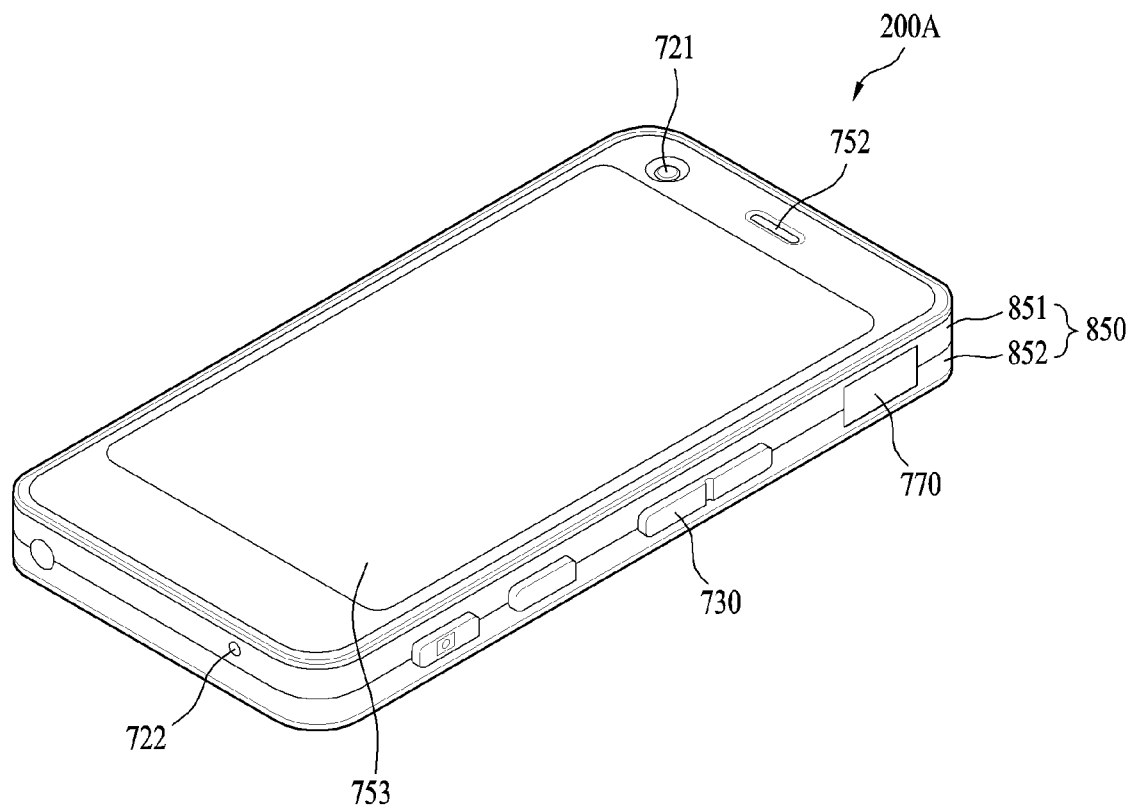
FIG. 23 is a perspective view of a portable terminal according to an embodiment.
Figure 24:
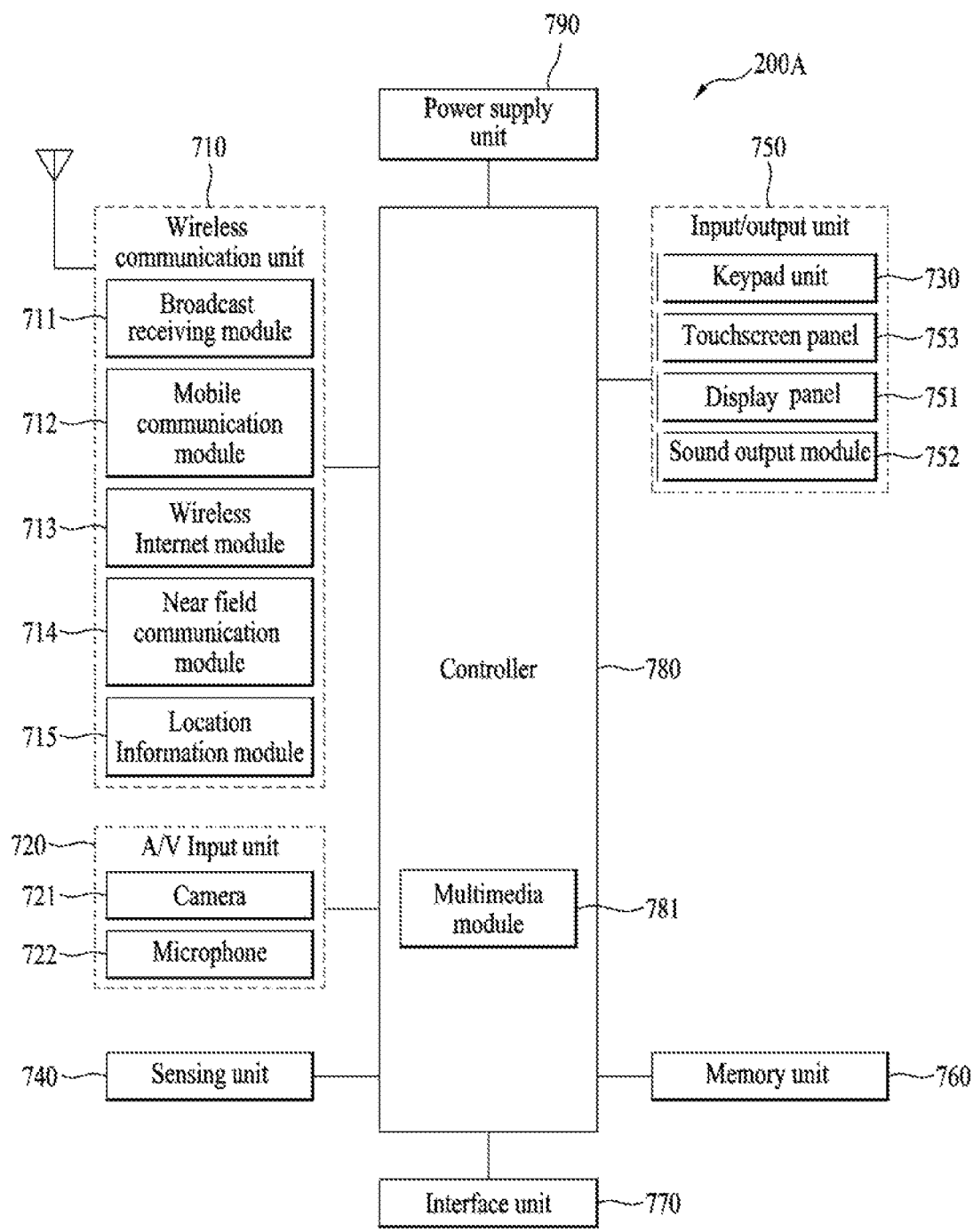
FIG. 24 is a view illustrating the configuration of the portable terminal illustrated in FIG. 23.

FIG. 23 is a perspective view illustrating a portable terminal 200A according to an embodiment. FIG. 24 is a view illustrating the configuration of the portable terminal 200A illustrated in FIG. 23.

Referring to FIGS. 23 and 24, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 23 has a bar shape, without being limited thereto, and may be any of various types such as, for example, a slide type, a folder type, a swing type, or a swivel type, in which two or more sub-bodies are coupled so as to be movable relative to each other.

The body 850 may include a case (e.g. casing, housing, or cover) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may be the camera 200 including the camera module 200 according to the embodiment shown in FIG. 22.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals applied thereto. For example, the display module 751 may include at least one among a liquid crystal display, a thin-film-transistor-liquid crystal display, an organic light-emitting diode, a flexible display and a 3D display.

The sound output module 752 may output audio data received from the wireless communication unit 710 in, for example, a call signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 780 or may be embodied separately from the controller 780.

The controller 780 may perform a pattern recognition process capable of recognizing writing input or drawing input carried out on a touch screen as a character and an image, respectively.

For example, the controller 780 may include an algorithm, which is used perform a feedback operation based on the result of detection of the displacement of the bobbin 110.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configuration, effects and the like exemplified in the respective embodiments may be combined with other embodiments or modified by those skilled in the art. Accordingly, content related to these combinations and modifications should be construed as falling within the scope of the embodiments.

INDUSTRIAL APPLICABILITY

The embodiments may be applied to a lens moving apparatus capable of preventing magnetic-field interference between the drive magnet and the sensing magnet and improving the accuracy and reliability of AF operation, and to a camera module and an optical device each including the same.

The invention claimed is:

1. A lens moving apparatus comprising:
a housing;
a bobbin disposed inside the housing;
a coil disposed at the bobbin, a drive signal and a sensing signal being provided to the coil;
a magnet disposed at the housing; and
a position sensor disposed at the housing,
wherein the position sensor detects location of the bobbin based on a magnetic field generated by the coil,
wherein the magnet includes a first magnet and a second magnet,
wherein the position sensor is disposed adjacent to at least one of the first magnet and the second magnet, and
wherein the position sensor does not overlap at least one of the first magnet and the second magnet in a direction toward an optical axis from the position sensor.

2. The lens moving apparatus according to claim 1, wherein the position sensor is disposed adjacent to the first magnet, and does not overlap the first magnet in the direction toward the optical axis from the position sensor.

3. The lens moving apparatus according to claim 1, wherein the magnet is not disposed between the position sensor and a coil region, the coil region being a partial region of the coil that overlaps the position sensor in the direction toward the optical axis from the position sensor.

4. The lens moving apparatus according to claim 1, wherein the position sensor is disposed between the first magnet and the second magnet.

5. The lens moving apparatus according to claim 1, wherein the drive signal is a DC signal and the sensing signal is a DC signal or an AC signal.

6. The lens moving apparatus according to claim 1, wherein an output signal of the position sensor includes a zone in which the output signal varies linearly as the bobbin is moved.

7. The lens moving apparatus according to claim 1, wherein the coil includes a first coil and a second coil, which are disposed on an outer surface of the bobbin and are conductively isolated from each other, and
wherein the first coil is provided with the drive signal, which is a DC signal, and the second coil is provided with the sensing signal, which is an AC signal.

8. The lens moving apparatus according to claim 7, wherein a maximum value of the sensing signal is greater than an intensity of the drive signal.

9. The lens moving apparatus according to claim 1, wherein the drive signal is a PWM (pulse width modulation) signal, and the sensing signal is an AC signal,
wherein the drive signal and the drive signal are provided to the coil in a time-division manner, and
wherein a maximum value of the sensing signal is greater than a maximum value of the drive signal.

10. The lens moving apparatus according to claim 1, wherein each of the drive signal and the sensing signal is a PWM (pulse width modulation) signal, and a duty ratio of the PWM signal, which is the sensing signal, is less than a duty ratio of the PWM signal, which is the drive signal.

11. The lens moving apparatus according to claim 1, wherein each of the drive signal and the sensing signal is a DC signal.

12. The lens moving apparatus according to claim 8, wherein a first magnetic field of the first coil, responding to the drive signal, and a second magnetic field of the second coil, responding to the sensing signal, are generated in a direction such that the two magnetic fields are reinforced by each other.

13. The lens moving apparatus according to claim 1, comprising a circuit board disposed at the housing and electrically connected to the position sensor.

14. The lens moving apparatus according to claim 1, comprising an elastic member coupled to the bobbin and the housing,
wherein the elastic member comprises first and second spring spaced apart from each other, and
wherein one end of the coil is coupled to the first spring and the end of the coil is coupled to the second coil.

15. The lens moving apparatus according to claim 7, comprising an elastic member coupled to the bobbin and the housing,
wherein the elastic member comprises first to fourth springs spaced apart from each other, and
wherein the first coil is electrically connected to the first and second springs and the second coil is electrically connected to the third and fourth springs.

16. The lens moving apparatus according to claim 7, wherein the first and second coils are wound at the outer surface of the bobbin, and
wherein a number of times the second coil is wound, is greater than a number of times the first coil is wound.

17. The lens moving apparatus according to claim 1, wherein the magnet is disposed at a side portion of the housing, and the position sensor is disposed at a corner portion of the housing.

18. The lens moving apparatus according to claim 1, comprising:
    an upper elastic member coupled to an upper portion of the bobbin and an upper portion of the housing;
    an OIS coil disposed under the housing and facing the magnet in a direction parallel to the optical axis;
    a circuit board disposed under the OIS coil; and
    a support connecting the upper elastic member and the circuit board.

19. A lens moving apparatus comprising:
    a housing;
    a bobbin disposed inside the housing;
    a coil disposed at the bobbin and comprising a first coil and a second coil;
    a magnet disposed at the housing;
    a position sensor disposed at the housing; and
    a circuit board comprising first to fourth terminals,
    wherein the first coil is provided with a drive signal, and the second coil is provided with a sensing signal,
    wherein the drive signal is a DC signal, and the sensing signal is an AC signal,
    wherein the position sensor detects location of the bobbin based on a magnetic field generated by the coil,
    wherein the first coil is electrically connected to the first and second terminals, and
    wherein the second coil is electrically connected to the third and fourth terminals.

20. A camera module comprising:
    a lens;
    the lens moving apparatus for mounting the lens according to claim 1; and
    an image sensor.

\* \* \* \* \*